United States Patent
Froger et al.

(12) 
(10) Patent No.: US 6,438,500 B1
(45) Date of Patent: Aug. 20, 2002

(54) METHOD AND DEVICE FOR DETECTING THE ABSENCE OF A PRODUCT IN A RESERVOIR

(75) Inventors: Marie-Hélène Froger, Chateaugiron; Pascal Coudray, La Chapelle des Fougeretz; François Delumeau, Rennes, all of (FR); Alexandre Dodge, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/104,782

(22) Filed: Jun. 26, 1998

(30) Foreign Application Priority Data

| Jun. 26, 1997 | (FR) | ............................................. 97 08051 |
| Jun. 26, 1997 | (FR) | ............................................. 97 08052 |
| Jun. 26, 1997 | (FR) | ............................................. 97 08050 |

(51) Int. Cl.[7] ................................................ B41J 2/195
(52) U.S. Cl. ............................ 702/55; 702/50; 702/52; 702/189; 347/7
(58) Field of Search ............................... 702/55, 57, 66, 702/50, 70, 71, 73, 74, 65, 75–79, 106, 107, 108, 112, 122, 129, 126, 127, 183, 189, 193, 148, 199, FOR 103, FOR 104, FOR 107, FOR 108–FOR 110, FOR 134, FOR 168, FOR 170, FOR 171, 52; 324/76.15, 19.21, 76.22, 76.24, 76.33, 76.34, 672; 708/422–426, 5, 813–815; 347/7, 14; 340/612; 375/150, 142, 343; FOR 107–FOR 109; 700/73, 74

(56) References Cited

U.S. PATENT DOCUMENTS

| 3,646,334 | A | | 2/1972 | Wold ........................... 235/181 |
| 4,821,023 | A | | 4/1989 | Parks .......................... 340/551 |
| 4,853,718 | A | | 8/1989 | ElHatem et al. ........ 346/140 R |
| 5,001,675 | A | | 3/1991 | Woodward .................... 367/13 |
| 5,185,783 | A | | 2/1993 | Takahashi et al. ............ 379/93 |
| 5,392,046 | A | | 2/1995 | Hughes ........................ 342/22 |
| 5,406,586 | A | * | 4/1995 | Wang ............................ 708/5 |
| 5,896,304 | A | * | 4/1999 | Tiemann et al. ............... 708/5 |
| 6,163,563 | A | * | 12/2000 | Baker et al. ................ 375/150 |

* cited by examiner

*Primary Examiner*—Hal Wachsman
(74) *Attorney, Agent, or Firm*—Fitzpatrick, Cella, Harper & Scinto

(57) ABSTRACT

Detecting presence or absence of product in a reservoir by transmitting a signal affected by the product. The signal is detected from among other signals with which it is subsequently received by discrimination and delivery of an output signal whose level is set by the discrimination, and by sampling. Pairs of samples are correlated to obtain a true correlation value SR, where the instantaneous value of correlation between the state value B(i) and the state value B(i+Z) is summed, Z being the number of samples taken during a period T of the signal to be detected. A rate calculation is performed, during which the rate ρ of samples representing the presence of the signal is measured, and theoretical correlation mean values are evaluated. A decision is made by comparison of the true correlation value SR with each theoretical correlation mean value.

71 Claims, 18 Drawing Sheets

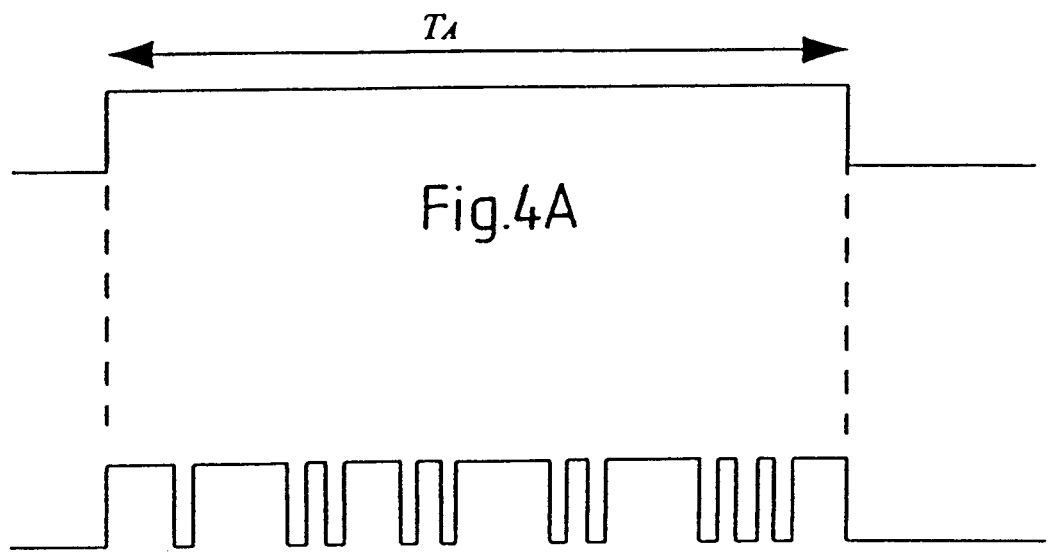
Fig.4A
Fig.4B
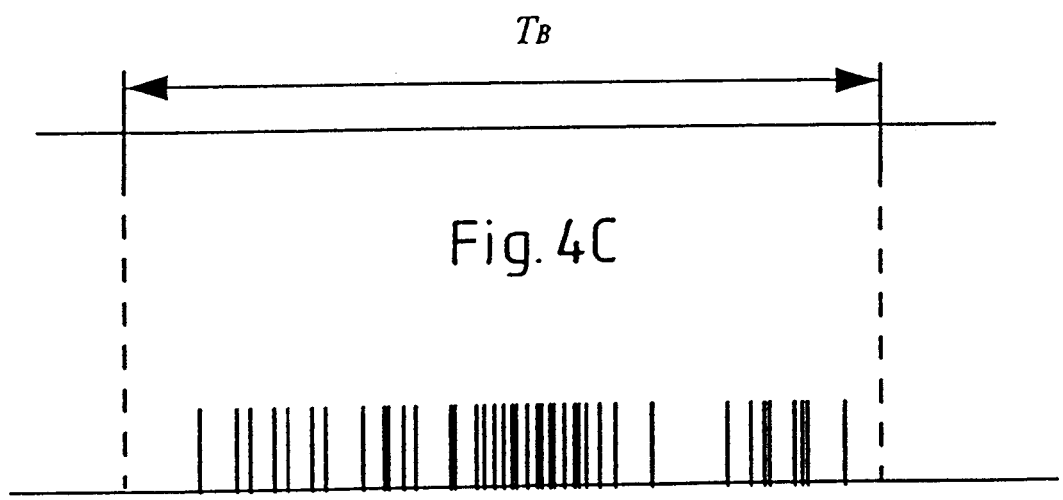
Fig.4C
Fig.4D

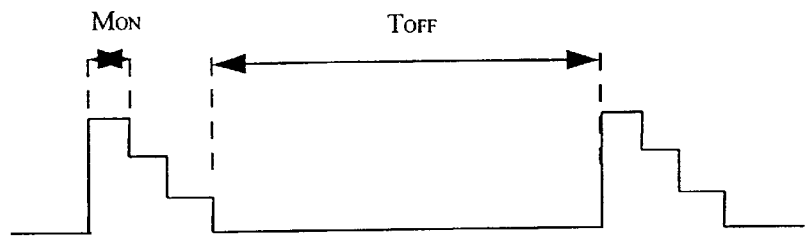
Fig. 4N
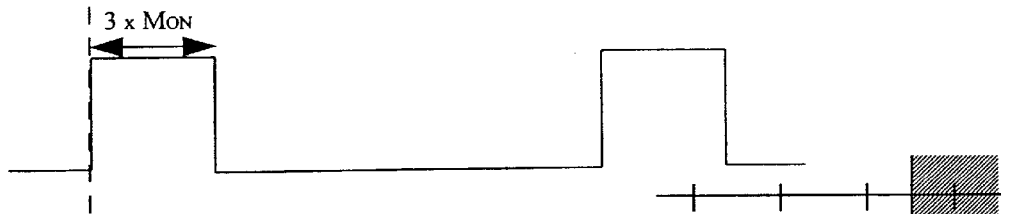
Fig. 4I
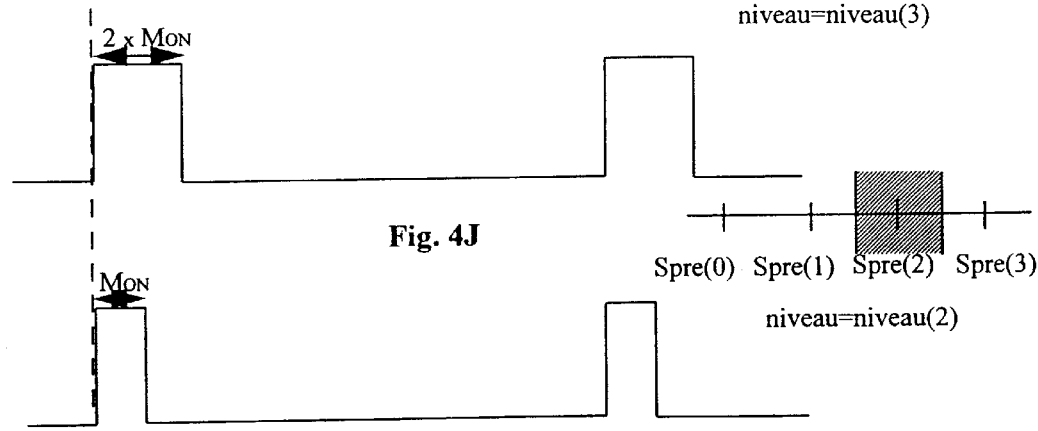
Fig. 4J
Fig. 4K
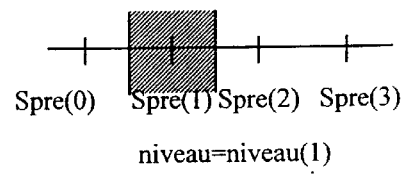
Fig. 4L
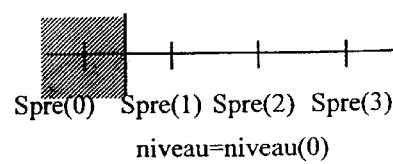

METHOD AND DEVICE FOR DETECTING THE ABSENCE OF A PRODUCT IN A RESERVOIR

BACKGROUND OF THE INVENTION

1. Field of the Invention

The present invention concerns a method and a device for detecting the absence of a product in a reservoir. More particularly, the present invention concerns the detection of ink in a removable print cartridge of an image transfer device.

2. Description of the Related Art

For image transfer devices which use ink-jet technology, such as ink-jet printers, many devices and methods have been designed to detect the absence of ink.

A first known type of detection uses the electrical characteristics of the ink by measuring the resistance thereof between two electrodes.

The document EP-A-0 370 765 describes a detection device comprising two electrodes placed in the channel connecting an ink ejection head to the ink reservoir and a means of detecting the electrical resistance between the two electrodes. The first electrode is situated in proximity to the ejection head while the second is remote from it. A potential difference is applied between these two electrodes. The resistance of the ink is measured and the presence or absence of the ink is deduced from the measured resistance value.

This device has many drawbacks.

The two electrodes must necessarily be spaced out by a predetermined distance, which complicates the production of the ink cartridge or the ejection head and increases the production cost. Furthermore, during the printing of a document, the electrodes are subjected to electromagnetic interference which affects the detection of the resistance.

In an image transfer device which uses ink-jet technology, such as an ink-jet printer, a print head has a plurality of ink transfer means in the form of ejection channels, generally identical and parallel, which make it possible to simultaneously eject a number of drops of ink of different pigmentation and thus increase the print speed of the image transfer device.

In the course of their research, the inventors determined that, by transmitting electrical energy to the ink contained in an ejection channel and analyzing the effect produced, it is possible to deduce information on the operation of the channel under consideration.

However, according to the methods and devices for detecting signal presence known in the prior art, for example by rejection filter, detection of the signal transmitted by a channel necessitates positioning the print head in a fixed position, which prevents the detection of ink during the print phases. This constraint considerably reduces the number of pages which can be printed during a predetermined period, or the number of ink detection phases is very limited.

These considerations become all the more significant as the number of ink reservoirs becomes larger, which further increases the constraint for color printers.

The document EP-A-0 028 399 describes a device for detecting a minimum quantity of ink in a reservoir. A resonant circuit has a resistor and a capacitor, the poles of which are formed by two metal plates between which the ink reservoir is located. The reservoir containing the ink forms the dielectric of the capacitor. As the quantity of ink decreases, the value of the capacitance of the capacitor thus formed varies.

The resonant circuit is calibrated so that its resonant frequency corresponds to a predetermined quantity of ink in the reservoir. The maximum voltage at the terminals of the resistor is thus reached for this predetermined quantity of ink which constitutes a threshold.

By measuring the voltage at the terminals of the resonant circuit resistor, the crossing of the threshold is detected, and an alarm signal is activated.

According to this document, only the crossing of one threshold can be measured, and consequently a single quantity of ink can be detected. Under these conditions, this device is of interest if the quantity of ink detected is small, in order to alert the user just before there is no more ink in the reservoir.

However, in particular because of the poor signal detection signal to noise ratio, it is very difficult with this device to determine accurately what voltage exactly corresponds to a small quantity of ink. It is then necessary to provide a safety margin in order to alert the user before the reservoir is empty. This safety margin, for example of the order of 20 percent of the total quantity of ink, leads to a wastage of ink, since the user will change the reservoir while there is ink remaining inside.

The failings described above concerning the transmission of a signal to an ejection channel are also valid with regard to the document EP-A-0 028 399.

Persons skilled in the art may also be induced to cause the sending of a signal in order that the reception thereof is affected by the quantity of product he wishes to detect or measure. He must then use signal detection techniques of known type.

To that end, in the field of signal detection, a device capable of detecting a periodic signal when it is mixed in a set of signals is known through the document U.S. Pat. No. 5,185,783. Such a device comprises a filter capable of selecting only the frequency of the carrier (affected by its tolerance) from a set of signals sent on the telephone line and containing a signal mixed with other signals. The signal at the output of the filter is sampled. The samples are processed as they are taken. By counting them and testing for crossing of a numerical threshold by the number of samples obtained during this counting, an attempt is made to determine the occurrence of a period $T_{ON}$ then that of a period $T_{OFF}$. The presence of the signal is validated when one period $T_{OFF}$ and one period $T_{ON}$ have been detected.

This method is not satisfactory in all cases and the inventor has notably observed the following drawbacks:

the method is highly sensitive to parasitic signals whose frequency is in the frequency band of the signal to be detected. In the case where these signals are too numerous, at least one of the periods $T_{ON}$ or $T_{OFF}$ is not recognized, in the case of samples not recognized as belonging to a period $T_{ON}$ or $T_{OFF}$, the information contained in these samples, although possibly significant, is lost. There results, at the very least, a delay in detection of the signal.

SUMMARY OF THE INVENTION

The present invention aims to remedy the drawbacks of the prior art by providing a device and a method for determining the absence of product in at least one reservoir, with a satisfactory reliability and accurately, while being simple and economical to implement.

To that end, according to a first aspect, an object of the invention is a method of detecting the absence of a product in a reservoir consisting, during a transmission step, of transmitting a signal affected by the presence of the product in the reservoir, and of detecting the presence of the signal amongst a set of signals, the signal having an occurrence duration $T_{ON}$, comprising notably:

a) a discrimination step, during which the said signal is discriminated from the set of signals, and an output signal is delivered, the level of which represents the result of the said discrimination of the said signal from the said set of signals, b) a sampling step, during which the said level thus obtained is sampled in In signal samples spread over a duration greater than a repetition period T a method characterized in that it also comprises:

c) a correlation step, during which, to each sample of rank i varying from 1 to In, a state value B(i) representing its level is mapped and, during at least part of the sampling duration, a true correlation value SR is calculated, by summing, for each pair of samples of ranks i and i+Z, the instantaneous value of correlation between the state value B(i) and the state value B(i+1), the samples of ranks i and i+Z being located at instants displaced by a period T, Z being the number of samples taken during a period T of the signal to be detected.

d) a rate calculation step, during which the rate ρ of samples, whose level represents the presence of the said signal, is measured over at least part of the sampling duration, this rate ρ being the ratio of the number of samples whose level represents the presence of the signal to be detected, over the total number of samples in the said part of the sampling duration, e) a theoretical evaluation step, during which the determination of at least one theoretical mean value is carried out, and f) a decision step, during which the true correlation value SR is compared with each theoretical mean value, and the presence or absence of the signal to be detected is deduced from the result of this comparison.

This method meets the objectives stated above. In particular, the detection remains effective even when the periodic signal is mixed in a set of signals with a high density of parasitic signals.

This method has the advantage of detecting the absence of ink in at least one channel in order to thus rapidly determine a dysfunctioning of the printing device. This method has a further advantage of making it possible, by virtue of the digital filtering, to detect the dysfunctioning of the printing device during printing.

This method also has the advantage of not requiring specific, and therefore costly, components.

According to particular characteristics, during the transmission step, a plurality of signals each affected by the presence of product in a plurality of reservoirs is transmitted successively, and the presence of the plurality of the signals is detected.

Preferentially, during the theoretical evaluation step, the determination of a plurality of theoretical presence mean values, corresponding to the presence of product in a plurality of reservoirs, is carried out.

By virtue of these provisions, the absence of product in any one of these reservoirs can be detected by performing a single measurement.

According to a second aspect, the invention also relates to a device for detecting the absence of a product in a reservoir having sending means adapted to transmit a signal affected by the presence of the said product in the reservoir, during a transmission step, and receiving means, conversion means and processing means adapted to detect the presence of the signal among a set of signals, the signal having an occurrence duration $T_{ON}$, the receiving means, the conversion means and the processing means being adapted notably:

to discriminate the said signal from the set of signals and to deliver an output signal, the level of which represents the result of the said discrimination of the said signal from the said set of signals, and to sample the said level thus obtained in In signal samples spread over a duration greater than a repetition period T characterized in that, furthermore, the processing means are adapted:

to map, to each sample of rank i varying from 1 to In, a state value B(i) representing its level, and to calculate, during at least part of the sampling duration, a true correlation value SR, by summing, for each pair of samples of ranks i and i+Z, the instantaneous value of correlation between the state value B(i) and the state value B(i+Z), the samples of ranks i and i+Z being located at instants displaced by a period T, Z being the number of samples taken during a period T of the signal to be detected, to measure, over at least part of the sampling duration, the rate ρ of samples whose level represents the presence of the said signal, this rate ρ being the ratio of the number of samples whose level represents the presence of the signal to be detected, over the total number of samples in the said part of the sampling duration, to determine at least one theoretical mean value, and to compare the true correlation value SR with each theoretical mean value and to deduce the presence or absence of the signal to be detected from the result of this comparison.

The present invention also concerns a method and a device for measuring a quantity of product in at least one reservoir. More particular, the present invention concerns the measurement of the ink level in a removable print cartridge in an image transfer device.

The present invention aims to remedy the drawbacks of the prior art by providing a device and a method for measuring a quantity of product in at least one reservoir, with a satisfactory reliability and accurately, while being simple and economical to implement.

To this end, according to a third aspect, an object of the invention is a method for measuring a quantity of product in at least one reservoir, consisting, during a transmission step, for each reservoir, of sending a signal affected by the presence of the product in the reservoir, and detecting the presence of the signal amongst a set of signals, the signal having in succession at least two non zero amplitudes during an occurrence duration $T_{ON}$, a method including notably:

a) a discrimination step, during which the said signal is discriminated from the set of signals, and an output signal is delivered, the level of which represents the result of the said discrimination of the said signal from the said set of signals, b) a sampling step, during which the said level thus obtained is sampled in In signal samples spread over a duration greater than a repetition period T a method characterized in that it also comprises:

c) a correlation step, during which, to each sample of rank i varying from 1 to In, a state value B(i) representing its level is mapped and, during at least part of the sampling duration, a true correlation value SR is calculated, by summing, for each pair of samples of ranks i and i+Z, the instantaneous value of correlation between the state value B(i) and the state value B(i+1), the samples of ranks i and i+Z being located at instants displaced by a period T, Z being the number of samples taken during a period T of the signal to be detected, d) a rate calculation step, during which the rate ρ of samples, whose level represents the presence of the said signal, is measured over at least part of the sampling duration, this rate ρ being the ratio of the number of samples whose level represents the presence of the signal to be detected, over the total number of samples in the said part of the sampling duration, e) a theoretical evaluation step, during which the determination of at least one theoretical correlation mean value is carried out, and f) a decision step, during which the true correlation value SR is compared with each theoretical mean value, and the quantity of product is deduced from the result of this comparison.

This method meets the objectives stated above. In particular, the measurement remains accurate even when the periodic signal is mixed in a set of signals with a high density of parasitic signals.

This method also has the advantage of not requiring specific, and therefore costly, components.

According to particular characteristics, the said signal has a succession of N non-zero amplitudes, having each of these amplitudes for a predetermined period. By virtue of these provisions, N different quantities of product can be determined sequentially.

According to a fourth aspect, the invention also relates to a device for measuring a quantity of product in at least one reservoir, having sending means adapted, for each reservoir, to send a signal capable of being affected by the presence of the said product in the said reservoir, and receiving means and processing means adapted to detect the presence of the said signal amongst a set of signals, the said signal having at least two non zero amplitudes during an occurrence duration $T_{ON}$, the receiving means and the processing means being adapted notably:

to discriminate the said signal from the set of signals and to deliver an output signal, the level of which represents the result of the said discrimination of the said signal from the said set of signals, to sample the said level thus obtained in In signal samples spread over a duration greater than a repetition period T characterized in that, furthermore, the processing means are adapted:

to map, to each sample of rank i varying from 1 to In, a state value B(i) representing its level, and to calculate, during at least part of the sampling duration, a true correlation value SR, by summing, for each pair of samples of ranks i and i+Z, the instantaneous value of correlation between the state value B(i) and the state value B(i+Z), the samples of ranks i and i+Z being located at instants displaced by a period T, Z being the number of samples taken during a period T of the signal to be detected, to measure, over at least part of the sampling duration, the rate ρ of samples whose level represents the presence of the said signal, this rate ρ being the ratio of the number of samples whose level represents the presence of the signal to be detected, over the total number of samples in the said part of the sampling duration, to determine at least one theoretical correlation mean value, and to compare the true correlation value SR with each theoretical correlation mean value and to deduce the quantity of product from the result of this comparison.

The present invention also concerns a method and a device for detecting an event liable to affect the transmission of a signal. More particularly, the present invention concerns the detection of an event affecting the transmission of a periodic electromagnetic signal and applies to the detection of products, objects, movements or faults.

The invention particularly aims to detect an event liable to affect a signal and, in order to do this, to send and receive this signal and detect, in the signal received, the presence of the signal, this presence signifying the sought-for event.

To this end, the invention aims to use a signal on which the incidence of the event is the most measurable by choosing physical characteristics of the signal and of its detection which are as adapted as possible to the transmission conditions and to the detection of the event in question.

Two constraints have in fact to be complied with:

the event must have an incidence which has as marked an effect as possible on the transmission of the signal, and the noise which affects the signal must not make detection of the event impossible or unreliable.

By way of example, the invention aims to detect an event consisting of the absence of ink in the ink cartridge reservoir of an ink jet printer, this absence of ink being able to attenuate the transmission of an electromagnetic signal through the reservoir. The invention consists of seeking the physical characteristics of an electromagnetic signal whose variation represents as far as possible the variation in the ink level and as little as possible the ambient noise.

To this end, according to a fifth aspect, an object of the invention is a method for detecting an event which affects the transmission of a signal, characterized in that it has.

a) a negative noise measurement step, which includes:

$a_1$) a negative test sending step during which a signal is sent having predetermined physical characteristics with an occurrence duration $T_A$, $a_2$) a negative test listening step during which a set of signals is received able to include a signal representing the signal sent during the negative test sending step, $a_3$) a negative discrimination step during which the signal sent during the negative test sending step is discriminated, from the set of signals received during the negative test listening step, and an output signal is delivered whose level represents the result of the said discrimination, $a_4$) a negative sampling step, during which the signal delivered during the negative discrimination step is sampled and a negative noise value s is determined as being a function of the ratio of the number of samples which correspond to the discrimination of the said signal during the occurrence duration $T_A$, over the number of samples during the duration $T_A$, b) a positive noise measurement step, which includes:

$b_1$) a silence step during which no signal is sent for a duration $T_B$, $b_2$) a positive test listening step during which a set of signals is received, $b_3$) a positive discrimination step during which the signal sent during the negative test sending step is discriminated, from the set of signals received during the positive test listening step, and an output signal is delivered whose level represents the result of the said discrimination, b$_4$) a positive sampling step, during which the signal delivered during the positive discrimination step is sampled and a positive noise value r is determined as being a function of the ratio of the number of samples which correspond to the discrimination of the said signal during the duration T$_B$, over the number of samples during the duration T$_B$, c) a determination step, during which physical characteristics of a signal and of its detection are determined by taking into account the values of the positive and negative noises, d) a transmission step, during which a signal is sent having the said physical characteristics determined during the determination step, with a frequency f and an occurrence duration T$_{ON}$ in the course of a duration T, and a received set of signals is received, able to include a signal representing the said signal, e) a detection discrimination step, during which the said signal is discriminated from the set of signals received and an output signal is delivered whose level represents the result of the said discrimination of the said signal from the said set of signals received, f) a detection sampling step, during which there is sampled, whilst taking into account the said physical characteristics, the said level thus obtained in In signal samples distributed over a period greater than a repetition period T, et a decision step, during which the values of the samples are taken into account in order to decide on the presence or absence of the event to be detected.

By determining, during the determination step, physical characteristics of the signal and of its detection which take into account the negative and positive noises, it is possible, by virtue of the fifth aspect of the invention, to make the detection of the event reliable, even in a noisy environment which strongly interferes with the transmission of the signal.

According to particular characteristics, the method as briefly disclosed above also includes:

g) a correlation measurement step, during which there is mapped, to each sample of rank i varying from 1 to In, a state value B(i) representing its level and, during at least part of the sampling period, a true correlation value SR is calculated, by summing, for each pair of samples of ranks i and i+Z, the value of instantaneous correlation between the state value B(i) and the state value B(i+Z), the samples of ranks i and i+Z being located at instants displaced by a period T, Z being the number of samples taken during a period T of the signal to be detected.

h) a rate calculation step, during which the rate ρ of samples whose level represents the presence of the said signal is measured over at least part of the sampling duration, this rate ρ being the ratio of the number of samples whose level represents the presence of the signal to be detected, over the total number of samples in the said part of the sampling duration, i) a theoretical evaluation step, during which the determination of at least one theoretical correlation mean value is carried out, and j) a decision step, during which the true correlation value SR is compared with each theoretical mean value, and the presence or absence of the signal to be detected is deduced from the result of this comparison.

This method meets the objectives stated above. In particular, the detection remains effective even when the periodic signal is mixed in a set of signals with a high density of parasitic signals.

According to particular characteristics, the method as briefly disclosed above includes a noise test, during which a function of the positive and negative noises is compared, a function representing the probability of error which could be made during the decision step, with a predetermined value.

Advantageously, when the result of the noise test corresponds to a probability of error greater than a predetermined value, the transmission step is not performed.

By virtue of these provisions, when the evaluation of the risk of error shows that a decision is hazardous, the correlation measurement and, in consequence, the decision on the presence or absence of the event, is deferred.

According to particular characteristics, when the result of the noise test corresponds to a probability of error greater than a predetermined value, a change is made to the frequency of the signal sent during the test sending, silence and transmission steps.

By virtue of these provisions, the frequency of the signals used is modified when the noise test shows that the detection of the event cannot validly be effected with the previous frequency. These provisions make it possible in particular to make measurements in environments where a constant electromagnetic disturbance exists. It is known in fact that electric motors, discharge lamps or video monitors cause almost constant emissions of electromagnetic radiations which interfere with radio signals.

According to particular characteristics, the method as briefly disclosed above includes at least one rate consistency test step, during which a function of the rate ρ of samples, a function representing the consistency between the rate ρ of samples whose level represents the presence of the said signal and the positive and negative noises, is compared with a predetermined value.

Advantageously, when the result of the rate consistency test corresponds to an inconsistency greater than a predetermined value, the decision step is not performed.

By virtue of these provisions, it is ensured that the noise has not changed very much since the measurement of the positive and negative noises and that it is therefore possible to take a decision validly, with a reasonable risk of error.

In a particular embodiment, the calculation of the said actual correlation value SR is made by summing the product B(i).B(i+Z) of the pairs of state values in accordance with the following formula:

$$SR = \sum_{i=1}^{i=In-Z} B(i) \cdot B(i+Z)$$

in which Z is the number of samples taken during a period T.

The formula given here for the correlation calculation is particularly simple to use.

In the particular embodiment, the said first theoretical absence mean value Sabs is calculated in accordance with the following formula:

$$Sabs = (In-Z)\rho^2$$

in which:

Z is the number of samples during a period T, et

In is the total number of samples.

Likewise, in this embodiment, a second theoretical presence mean value Spre is calculated in accordance with the following formula:

$$Spre=(In-Z)[(ON*(s-\rho)^2/OFF)+\rho^2]$$

in which

ON is the number of samples during a duration $T_{ON}$

OFF is the number of samples during a "silence" duration $T_{OFF}$ between two durations $T_{ON}$, and, during the decision step, the true correlation value SR is compared with the two theoretical absence mean value Sabs and theoretical presence mean value Spre and the presence or absence of the signal to be detected is deduced according to the result of these comparisons.

According to this particular embodiment, the theoretical mean values correspond to results of estimations starting from respective assumptions on the presence and absence of the signal to be detected. They therefore form indicators adapted to the taking of an effective decision.

The invention also relates to a method as briefly disclosed above in which the signal to be detected is a signal sent for detecting:

an object liable to affect the transmission of the signal sent during the transmission step, a quantity of material liable to affect the transmission of the signal sent during the transmission step, a fault in a transmission channel liable to affect the transmission of the signal sent during the transmission step, or a movement of material liable to affect the transmission of the signal sent during the transmission step.

According to a sixth aspect, the invention also relates to a device for detecting an event liable to affect the transmission of a signal, characterized in that it has:

calculation means, a sending means, a receiving means and a discrimination means, conjointly adapted to perform:

a) a negative noise measurement, which includes:
   $a_1$) a negative test sending step during which the sending means sends a signal having predetermined physical characteristics with an occurrence duration $T_A$,
   $a_2$) a negative test listening step during which the receiving means receives a set of signals able to include a signal representing the signal sent during the negative test sending step,
   $a_3$) a negative discrimination step during which the discrimination means discriminates the signal sent during the negative test sending step, from the set of signals received during the negative test listening step, and delivers an output signal whose level represents the result of the said discrimination,
   $a_4$) a negative sampling step, during which the calculation means sample the signal delivered during the negative discrimination step and determine a negative noise value s as being a function of the ratio of the number of samples which correspond to the discrimination of the said signal during the occurrence duration $T_A$, over the number of samples during the duration $T_A$, b) a positive noise measurement step, which includes:
   $b_1$) a silence step during which the sending means sends no signal for a duration $T_B$,
   $b_2$) a positive test listening step during which the receiving means receives a set of signals,
   $b_3$) a positive discrimination step during which the discrimination means discriminates the signal sent during the negative test sending step, from the set of signals received during the positive test listening step, and delivers an output signal whose level represents the result of the said discrimination,
   $b_4$) a positive sampling step, during which the calculation means sample the signal delivered during the positive discrimination step and determine a positive noise value r as being a function of the ratio of the number of samples which correspond to the discrimination of the said signal during the duration $T_B$, over the number of samples during the duration $T_B$, c) a determination step, during which the calculation means determine physical characteristics of a signal and of its detection by taking into account the values of the positive and negative noises, d) a transmission step, during which the sending means sends a signal having the said physical characteristics determined during the determination step, with a frequency f and an occurrence duration $T_{ON}$ in the course of a duration T, and the receiving means receives a received set of signals, able to include a signal representing the said signal, e) a detection discrimination step, during which the discrimination means discriminates the said signal from the set of signals received and delivers an output signal whose level represents the result of the said discrimination of the said signal from the said set of signals received, f) a detection sampling step, during which the calculation means sample, whilst taking into account the physical characteristics, the level thus obtained in In signal samples distributed over a period greater than a repetition period T, and a decision step, during which the calculation means take into account the values of the samples in order to decide on the presence or absence of the event to be detected.

The invention also relates to a printing device and a facsimile machine, characterized in that they have a device for detecting the absence of product as briefly disclosed above.

These devices have the same advantages as the method briefly disclosed above. These advantages are therefore not repeated here.

DESCRIPTION OF THE DRAWINGS

Other characteristics and advantages of the invention will emerge below with the help of the description which follows, given with reference to the accompanying drawings in which.

DETAILED DESCRIPTION OF THE PREFERRED EMBODIMENT

The first and the second aspects of the present invention will be described in view of FIGS. 1, 2A, 2B, 2C, 2D, 3A, 3B, 4A to 4H, 5, 6A, 6B and 7.

The third and the fourth aspects of the present invention will be described in view of FIGS. 1, 2A, 2B, 2C, 2D, 3A, 3B, 4A to 4G, 4I to 4N, 7, 8, 9A, and 9B.

The fifth and the sixth aspects of the present invention will be described in view of FIGS. 4A to 4G, 7, 10 and 11.

It should be noted that:

the description of the first, second, fifth and sixth aspects of the present invention is associated, with a view to the detection of absence of product in at least one reservoir, with detection of the presence of a periodic signal whose principal discrimination characteristic is frequency; and the description of the third and the fourth aspects of the present invention is associated, with a view to measuring the quantity of product in at least one reservoir, with detection of the presence of a periodic signal whose principal discrimination characteristic is frequency.

However, the invention is readily applied, for persons skilled in the art, to the detection of non-periodic signals, or those of which it is the amplitude, phase, or more generally any information modulating a physical quantity, which is the characteristic enabling discrimination among the set of signals.

In the entire description, the word "correlation" is used to designate a mathematical operation which, to a series of numbers B(i), where i represents the rank in the series, and at a step Z, maps the sum of all the products B(i).B(i+Z), such that these two elements are in the said series.

Figure 1A:
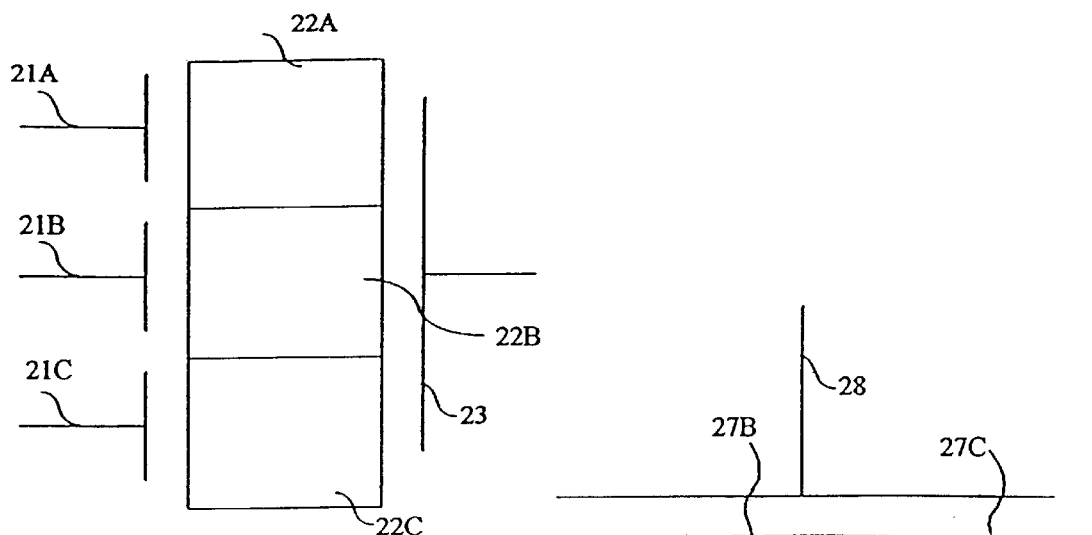
FIGS. 1A, 1B and 1C illustrate three devices for sending and receiving signals, the transmission of which is capable of being affected by the quantity of a product in a reservoir.

FIG. 1A depicts three sending electrodes 21A, 21B and 21C placed facing three ink reservoirs 22A, 22B and 22C. A receiving electrode 23 is placed facing the three reservoirs but opposite the sending electrodes 21A, 21B and 21C.

According to this first embodiment of the invention, the sending of the signal sent sequentially by each of the sending electrodes 21A, 21B and 21C is affected by the quantity of product in the reservoir which faces the said electrode. Detection of the signal which thus represents the quantity of product in the said reservoir makes it possible, by processing, to detect the product in each reservoir (first and second aspects of the invention) or measure the quantity of product in each reservoir (third and fourth aspects of the invention). The electrodes and the reservoirs constitute one or more capacitors: a sending electrode 21A (respectively 21B and 21C) associated with the reservoir 22A (respectively 22B and 22C) and with the receiving electrode 23 jointly constitute a capacitor, the capacitance of which changes with the quantity of product in the reservoir 22A (respectively 22B and 22C).

Figure 1B:
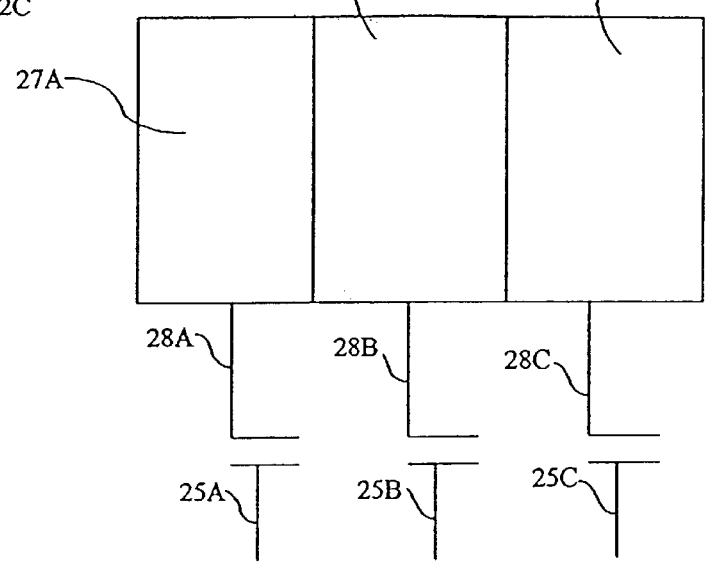

FIG. 1B depicts three capacitors, 25A-26A, 25B-26B and 25C-26C, composed of a conductor 25A, 25B or 25C connected to a sending circuit (not depicted), placed facing an ink ejection channel, respectively 26A, 26B and 26C, of an ink-jet print head.

Reservoirs 27A, 27B and 27C containing products are respectively connected to the channels 26A, 26B and 26C. A receiving electrode 28 is positioned facing each of the reservoirs.

According to this second embodiment of the invention, the transmission of the signal sent by each of the conductors 25A, 25B and 25C, to the reservoirs 27A, 27B and 27C, is affected by the presence of product in the channel and by the quantity of product in the said reservoir. Detection of the signal which thus represents the presence of product in the said channel makes it possible, by processing, to detect the said product (first and second aspect of the present invention) or to measure the quantity of the said product (third and fourth aspect of the present invention).

In FIG. 1B, three capacitors are composed of the electrode 28, the three reservoirs 27A, 27B and 27C and the three electrodes 25A, 25B and 25C, these electrodes being composed of the print heads of the printing device.

In a variant, not depicted, of this embodiment, the conductor 25A is connected by a galvanic link to the channel 26A, as well as respectively the conductors 25B and 25C, on the one hand, and the channels 26B and 26C, on the other hand.

Figure 1C:
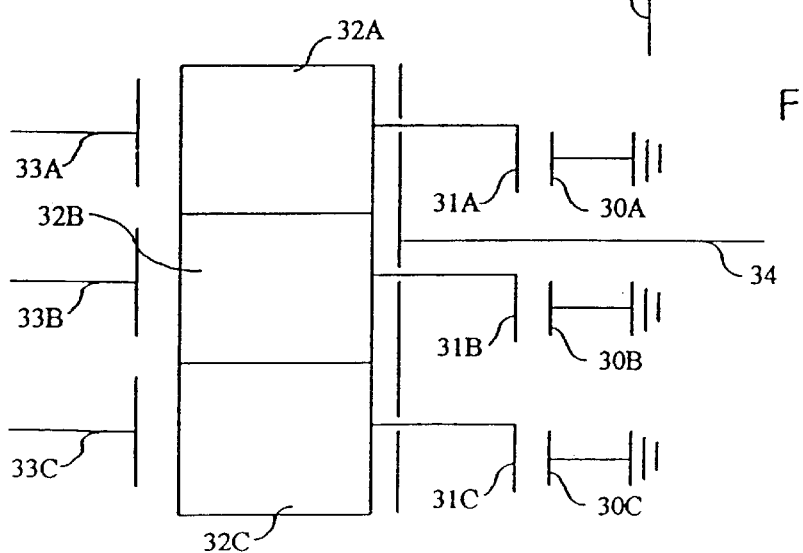

FIG. 1C depicts three capacitors, 30A-31A-32A-33A, 30B-31B-32B-33B and 30C-31C-32C-33C, composed of a conductor, 30A, 30B or 30C connected to an electrical earth, placed facing an ink ejection channel, respectively 31A, 31B and 31C, of an ink-jet print head.

Reservoirs 32A, 32B and 32C containing products are respectively connected to the channels 31A, 31B and 31C. Three sending electrodes 33A, 33B and 33C and a receiving electrode 34 are positioned on either side of all the reservoirs.

According to this third embodiment of the invention, the transmission of the signal sent by the sending electrodes 33A, 33B and 33C is affected by the quantity of product in the reservoirs 32A, 32B and 32C respectively and/or by the presence of product in the channels 31A, 31B and 31C (first to fourth aspects of the present invention) and/or by the presence of product in the channels 31A, 31B and 31C (first and second aspects of the present invention). Detection of each of these signals, which thus represents the quantity of product in each reservoir, makes it possible, by processing, to detect the said product, or, according to the third and the fourth aspects, to measure the said quantity.

As a variant, not depicted, of this embodiment, the conductors 30A and 31A are connected by a galvanic link, as well as respectively the conductors 30B and 31B, on the one hand, and the conductors 30C and 31C, on the other hand.

Figure 2A:
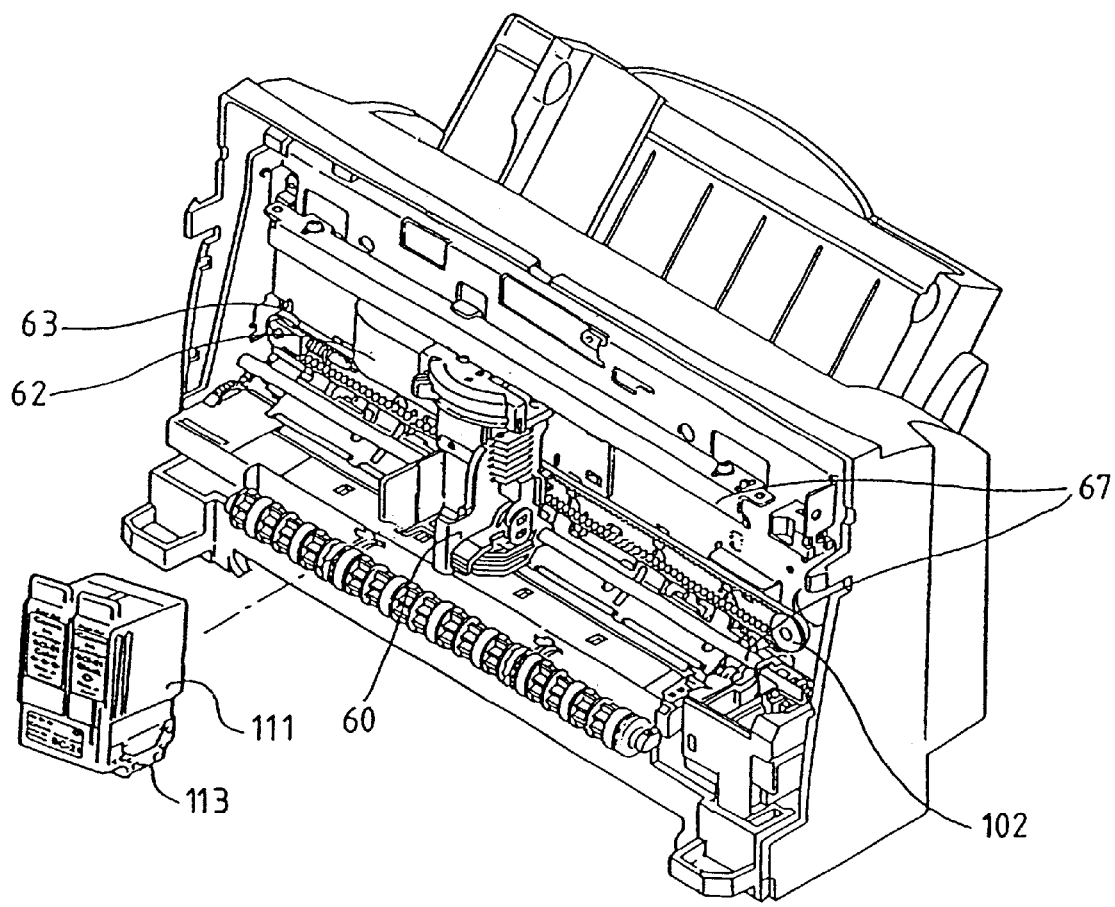
FIG. 2A is a perspective view of a printing device equipped with a plurality of reservoirs.
Figure 2D:
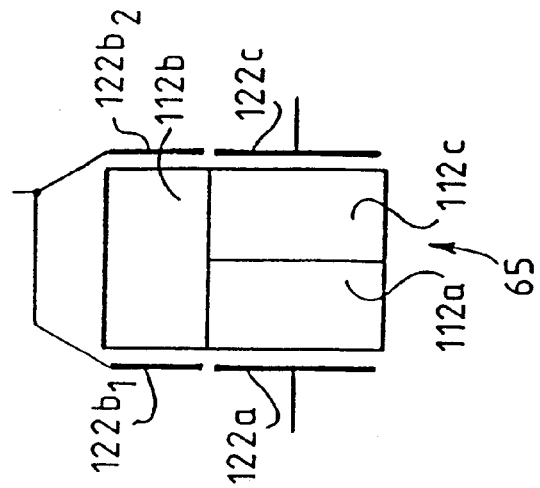
FIG. 2D is a schematic cutaway view of a removable print cartridge illustrated in FIGS. 2B and 2C.
Figure 2C:
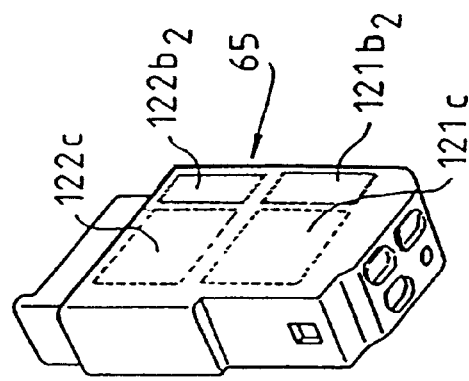
FIGS. 2B and 2C are perspective views of a removable print cartridge intended to be used by the printing device illustrated in FIG. 2A.

With reference to FIG. 2A, the printing device conventionally has a carriage 60 to carry the print cartridge 111. The carriage is driven with a reciprocating motion on a movement path formed by guidance rails 67. The motor 102 drives the carriage 60 by means of a belt device 63. The movement path of print heads 113a, 113b and 113c connected to the cartridge 111 is parallel to a line on a print medium, not depicted, such as a sheet of paper.

The print cartridge 111 carries the metallic elements 121a, 121b, 121c, 122a, 122b and 122c.

A flexible cable 62 connects the amplification circuit 114 (FIG. 3A) to the ink cartridge 111. The cable 62 also connects the amplifier 119 (FIG. 3A) to the metallic elements 121a, 121b and 121c, and the metallic elements 122a, 122b and 122c to the conversion circuit 115 (FIG. 3A)

The print cartridge 111 has three ink reservoirs 112a, 112b and 112c, respectively positioned between the metallic elements 121a and 122a, 121b and 122b, and 121c and 122c. Each ink reservoir has a plastic casing, which is for example filled with a porous body impregnated with colored ink.

Figure 2B:
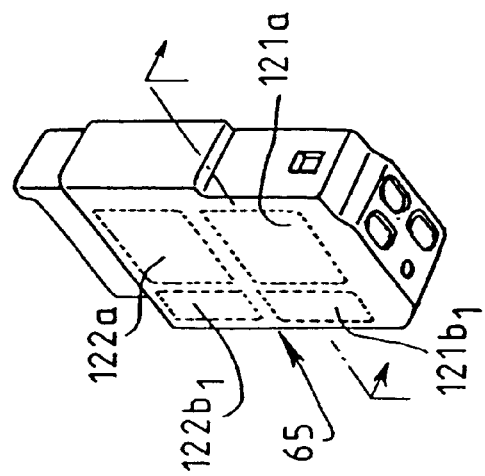
Figure 3A:
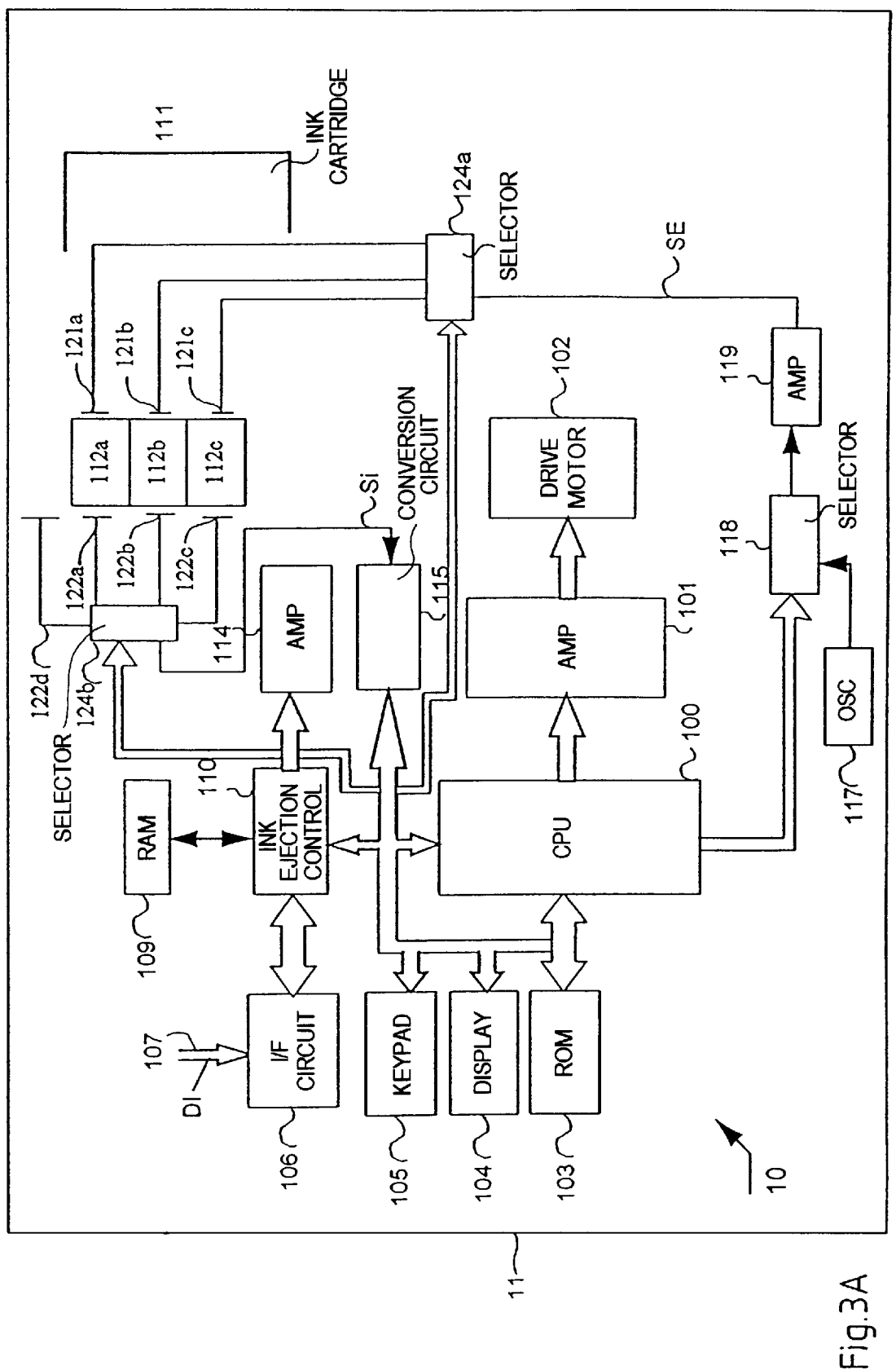
FIG. 3A is a block diagram of a device according to the present invention (first, second, third and fourth aspect)

In FIG. 2B, a cartridge 65 combining three reservoirs 112a–112c is intended to be carried by a carriage 60 (FIG. 3A). The cartridge is removable and exchangeable.

According to another possible embodiment, the three reservoirs 112a14 112c and the corresponding print heads 113 (FIG. 3A) can be combined in the same exchangeable cartridge. If the reservoirs form an exchangeable cartridge, one of the messages produced by the main processing circuit can indicate the necessity of changing the cartridge as soon as one of the reservoirs is empty. If, on the contrary, the reservoirs are intended to be filled when necessary, they can each have a filling aperture and one of the messages produced by the main processing circuit can indicate the necessity of filling such and such a reservoir.

The carriage 60 has a socket intended to receive the cartridge containing the reservoirs 112a–112c. This socket has parallel walls carrying electrodes 121 or 122 associated with the three reservoirs 112a–112c. Each electrode is here composed of a metal plate. At least one electrode per reservoir may advantageously be applied by elastic stressing means against the wall of the corresponding cartridge. Such stressing means may be implemented by a leaf spring 160 or similar interposed between one wall of the support and a movable insulating wall carrying certain electrodes. However, the electrodes may be defined by metallizations deposited on external surfaces of the cartridge constituting the three reservoirs. The form of these metallized electrodes appears in broken lines in FIGS. 2B and 2C. In this case, the carriage 60 may define a simple structure for housing the cartridges and carry electrical connection elements making it possible, by simple contact, to connect the different electrodes to the selectors 124a and 124b (FIG. 3A).

This arrangement of electrodes is possible, in view of the layout of the reservoirs constituting the cartridge, on account of each reservoir containing a conductive pigmented product. Its walls, that is to say the walls of the cartridge, are made of an insulating material, for example plastic. The three reservoirs 112a–112c are disposed side by side over substantially the whole height of the cartridge. In other words, this cartridge is composed of the juxtaposition of three independent reservoirs, the reservoir 112a for magenta, the reservoir 112b for cyan and the reservoir 112c for yellow. The reservoirs 112a and 112b each extend over half the width of the cartridge while the reservoir 112b extends from one lateral wall to the other. This arrangement of the reservoirs with respect to one another appears in FIG. 2D.

Because of this particular configuration of the cartridge, the electrodes 121a and 122a are disposed one above the other on the same lateral wall of the cartridge, on the side of the reservoir 112a, and the electrodes 121c and 122c are disposed on the opposite lateral wall of the cartridge, one above the other, on the side of the reservoir 112c. For the reservoir 112b, each electrode is divided into two parts joined together by electrical conductors. Each part has approximately a surface area equal to half that of an electrode 121 or 122 of one of the other two reservoirs. The two parts are respectively referenced 121b1, 121b2 with regard to the sending electrode of the reservoir 112b, and 122b1, 122b2 with regard to the receiving electrode associated with this same reservoir 112b. In fact, it can be considered that the two parts 121b1 and 121b2 constitute one and the same sending electrode 121b while the two parts 122b2 and 122b2 constitute one and the same receiving electrode 122b. Each electrode or electrode part has a rectangular form and is thus located applied against a plane face of the reservoir corresponding to it.

According to the embodiment depicted in FIG. 3A, the invention applies to an image forming device 10 included in a general manner in an image or data processing device 11.

The following description refers more particularly to an ink-jet printer, or to be included in a facsimile machine, or a microcomputer. The components other than those of the image forming device 10 are well known to persons skilled in the art and consequently are neither depicted nor described.

The image forming device 10 receives data to be printed DI by means of a parallel input/output port 107 connected to an interface circuit 106. The circuit 106 is connected to an ink ejection control circuit 110, which controls an ink cartridge 111, by way of an amplification circuit 114.

The ink cartridge 111 is exchangeable and is mounted on a carriage with reciprocating translational motion driven by a motor 102. The ink cartridge 111 has essentially three ink reservoirs 112a, 112b and 112c and three print heads 113a, 113b and 113c connected to one another, respectively, by three ducts (not depicted).

Thus the duct and the print head 113a (respectively 113b and 113c) contain ink coming from the reservoir 112a (respectively 112b and 112c).

The printer also has a main data processing circuit 100 having notably calculation means and a clock (not depicted) connected to the calculation means, for example composed of a clock generator and a frequency divider, supplying electrical pulses to the calculation means. The main circuit 100 is associated with a read-only memory 103 and a random access memory 109, memories whose contents are partially described with reference to FIG. 5. The read-only memory 103 contains the operating programs of the main processing circuit 100, while the random access memory 109, also associated with the ink ejection control circuit 110, temporarily stores the data DI received by means of the interface 106 as well as the data processed by the main processing circuit 100.

The main processing circuit 100 is connected to a display 104, on which the main processing circuit 100 controls the display of messages representing the operation of the printer. The main processing circuit 100 is connected to a keypad 105, having at least one switch, by means of which the user can transmit operating commands to the printer.

The main processing circuit 100 is also connected to the motor 102 by means of an amplification circuit 101. The motor 102 provides movement of the carriage which carries the print cartridge 111. The motor 102 is, for example, a stepping motor.

The printer described previously is conventional and well known to persons skilled in the art. It will therefore not be detailed further.

The printer thus has means 121a, 121b, 121c, 122a, 122b and 122c for establishing an electric field across the product present in each reservoir, means for measuring the electric field crossing the product in order to produce an electrical signal representing the electric field, a conversion circuit 115 and means 100 for processing the electrical signal in order to produce a signal representing the quantity of product present in the reservoir, and in order to detect this product (first and second aspects of the present invention) or in order to measure this quantity (third and fourth aspect of the present invention).

The electric field establishment means are here, for the reservoir 112a, a first and a second metallic element 121a and 122a, for the reservoir 112b, a first and a second metallic element 121b and 122b, and for the reservoir 112c, a first and a second metallic element 121c and 122c, the said metallic elements being fixed on the carriage 60 for moving the cartridge 111. As a variant, the first and second metallic elements are fixed on the outside of the walls of the ink cartridge 111. The elements 121a and 122a constitute the poles of a capacitor, the dielectric of which is formed by the reservoir 112a containing ink having a first color. The elements 121b and 122b constitute the poles of a capacitor, the dielectric of which is formed by the reservoir 112b containing ink of a second color. The elements 121c and 122c constitute the poles of a capacitor, the dielectric of which is formed by the reservoir 112c containing ink of a third color.

The electrical characteristics of the dielectric formed by each reservoir containing ink vary according to the quantity of ink contained by the said reservoir.

Each electric field is caused by application of a predetermined alternating excitation signal SE supplied by an oscillator 117 by way of a selector 118 and an amplifier 119. The excitation signal is a signal with a square envelope, with a carrier of frequency substantially equal to 5 MHz.

The main processing circuit 100 is connected to the selector 118 in order to control it and thus allow transmission of the alternating signal between the oscillator 117 and each element 121a, 121b or 121c constituting a capacitor pole.

A fourth element 122d is connected to the selector 124b. This element, which constitutes an electrode, receives, on the one hand, the same noise as the electrodes 122a, 122b and 122c and the signal sent by the elements 121a, 121b and 121c without the latter signal being affected by the presence of product in the reservoirs.

The metallic elements 122a, 122b and 122c are connected to a conversion circuit 115 having an input impedance of 1 Megohm, itself connected to the main processing circuit 100. According to the example embodiment described and depicted, the elements 122a, 122b and 122c are connected together by the selector 124b, in such a way that the selector supplies at its output either the sum of signals coming from the elements. 122a, 122b and 122c, or the signal coming from the element 122d. When the oscillator 117 successively supplies the metallic elements 121a, 121b and 121c, an electric field exists successively between the elements 121a and 122a, between the elements 121b and 122b and between the elements 121c and 122c. In response to the electric field, the amplitude of the electrical signal at the input of the conversion circuit 115 varies; the conversion circuit 115 in response supplies a digital signal to the main processing circuit 100. Here, the main processing circuit 100, subsequently also called "calculation means", is composed of software implemented in a controller.

Figure 3B:
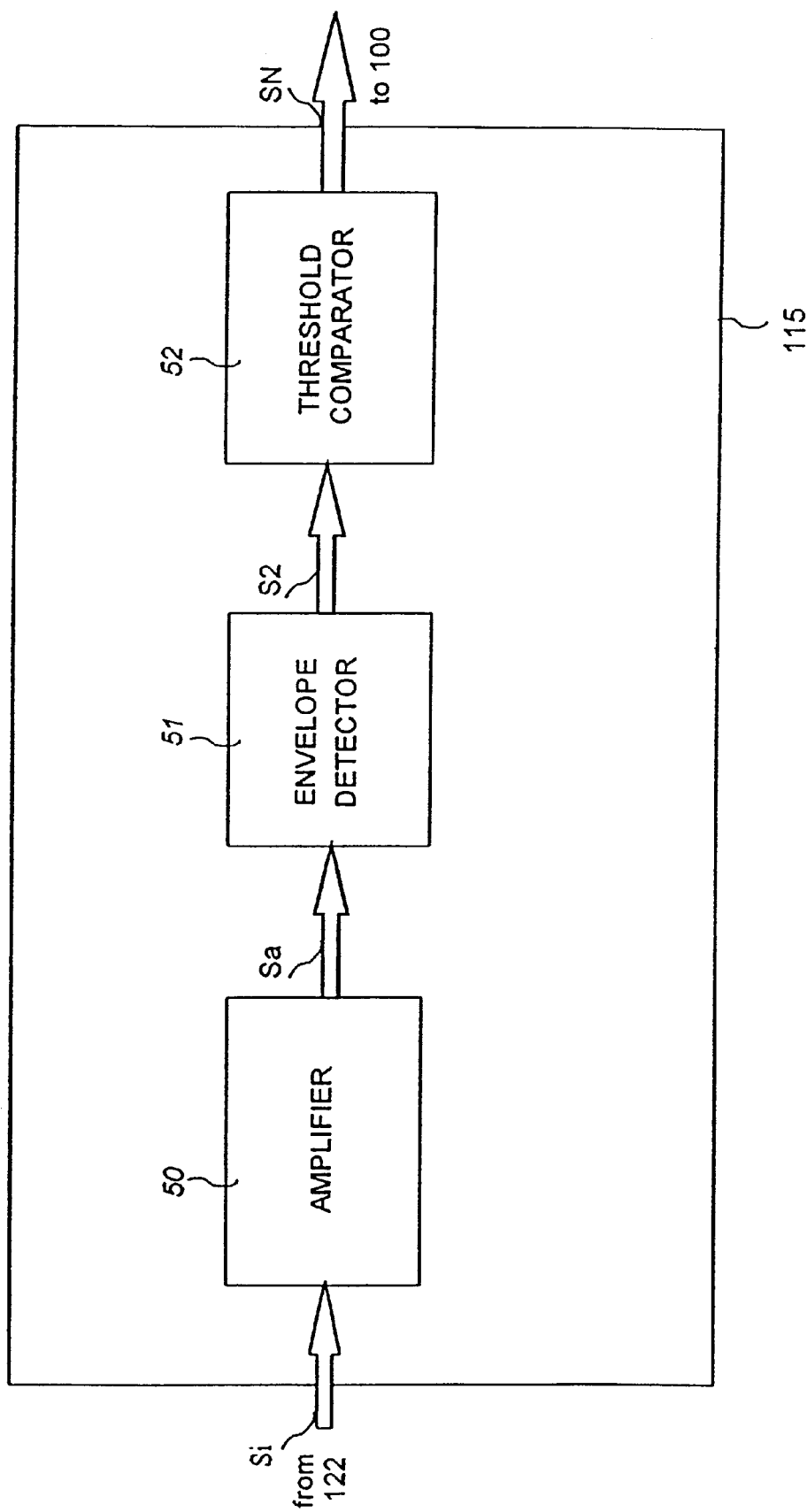
FIG. 3B is a block diagram of a discrimination device incorporated in the device illustrated in FIG. 3A, FIGS. 4A to 4G illustrate, with an explanatory aim, signals intended for a simple detection of product in a reservoir (first, second, fifth and sixth aspects of the present invention) or measurement of quantity of product in a reservoir (third and-fourth aspects of the present invention)

According to FIG. 3B, the conversion circuit 115 extracts the amplitude of the signal received by each metallic element 122a, 122b and 122c in response to the excitation signal. The conversion circuit 115 has an amplifier with an input impedance of 1 Megohm connected to an envelope detector used to determine the peak amplitude of the analogue signal supplied to it as an input. The envelope detector 51 is connected to a threshold comparator 52, an output of which is connected to the processing circuit 100.

Each metallic element 122a, 122b and 122c supplies an electrical signal to the amplifier 50, which amplifies the electrical signal S1 current-wise and voltage-wise so as to facilitate the following processing. The electrical signal S1 is a function of the capacitance existing between the two metallic elements 121a and 122a, 121b and 122b or 121c and 122c considered at the time of detection.

The amplifier 50 supplies the amplified signal SA to the envelope detector 51, which determines the amplitude of the amplified signal.

The signal S2 leaving the envelope detector 51 is supplied to the threshold comparator 52. The threshold comparator 52 converts the analogue signal S2 into the binary signal SN in order to transmit it to the processing circuit 100.

With an explanatory aim, FIGS. 4A to 4G illustrate signals intended for a simple detection of product in a reservoir.

FIGS. 4A and 4B depict the steps of determining negative noise s:

FIG. 4A depicts the signal sent during negative test sending: this signal has a square envelope which modulates a sinusoidal signal of period f, and an occurrence duration $T_A$, FIG. 4B depicts the signal received, after filtering, discrimination of the signal sent during the duration $T_A$, and sampling: it may be noted that 10 samples have a zero state value and 90 samples have a state value equal to 1, a value which corresponds to detection of the signal sent.

The negative noise is therefore here equal to s=90/100=0.9.

FIGS. 4C and 4D depict the steps of determining positive noise r;

FIG. 4C depicts the silence sent during the positive test, during a duration $T_B$, FIG. 4D depicts the signal received, after filtering, discrimination of the signal sent during the duration $T_A$ and sampling: it may be noted that 60 samples have a zero state value and 40 samples have a state value equal to 1, a value which corresponds to detection of the signal sent.

The positive noise therefore here has a value equal to r=40/100=0.4.

In accordance with one embodiment of the invention, the cycle ratio of the signal to be processed is then chosen as being equal to r/r+s=0.3 (the explanation of this choice being given below with reference to FIG. 6B, operation 1220).

Figure 4E:
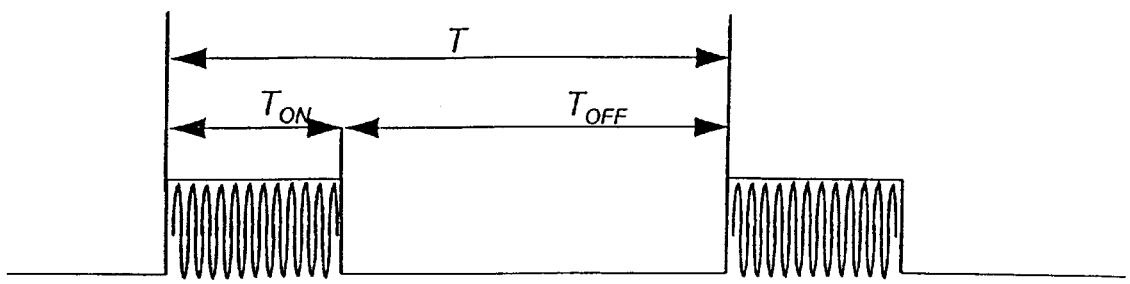
FIG. 4H illustrates the signal envelopes adapted for detection of the absence of product in at least one reservoir, according to the first, second, third and fourth aspects of the present invention, FIGS. 4I to 4L together with FIG. 4N, illustrate signals intended for a measurement of a quantity of product in a reservoir (third and fourth aspects of the present invention).
FIG. 4M illustrates a second envelope of a signal adapted for measuring product in a reservoir (third and fourth aspects of the present invention)

FIG. 4E shows a periodic signal of cycle ratio a equal to 0.3, with carrier frequency f and a square envelope, having, over one period, one positive pulse and one negative pulse.

It should be noted that, generally, during its period T, it consists of the sending of at least one frequency f during a first predetermined duration $T_{ON}$ and an absence of sending during a second predetermined duration $T_{OFF}$.

In accordance to the fifth and sixth aspects of the present invention, the frequency used f can belong to any range of frequencies: voice frequencies, high or very high frequencies, etc.

Figure 4F:
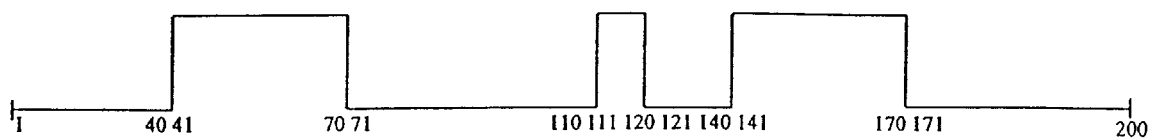

FIG. 4F illustrates the received signal, filtered, discriminated, and sampled, taking into account the characteristics of the signal to be detected (in particular its cycle ratio α, and possibly the characteristics of its detection, sampled over two periods T:

- the samples 1 to 40 have a zero state value B(i), which corresponds to absence of detection of the discriminated signal,
- the samples 41 to 70 have a state value B(i) equal to 1, which corresponds to detection of the discriminated signal,
- the samples 71 to 110 have a zero state value B(i),
- the samples 111 to 120 have a state value B(i) equal to 1,
- the samples 121 to 140 have a zero state value B(i),
- the samples 141 to 170 have a state value B(i) equal to 1, and
- the samples 171 to 200 have a zero state value B(i).

by summing, for each sample of rank i, i varying between 1 and In−Z, the instantaneous value of correlation between the state value B(i) and the state value B(i+Z). Z being the number of samples taken during a period T, and In the total number of samples, the samples i and i+Z are taken at instants displaced by a period T.

Figure 4G:
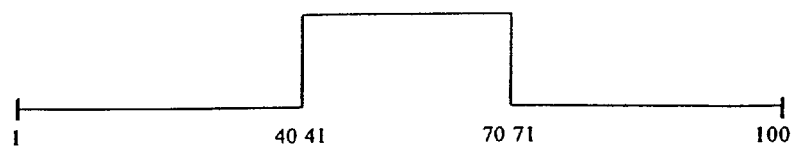
Figure 4G:
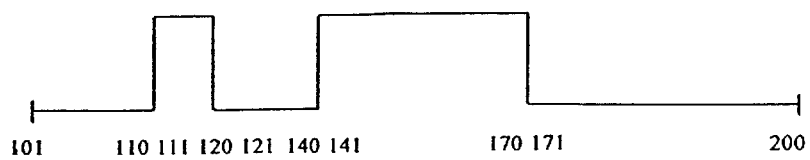

FIG. 4G illustrates the correlation measurement step as implemented in the particular embodiment of the invention. The signal of FIG. 4F is considered and is divided into two durations equal to a period T and the correlation of these two parts of the signal is carried out, with a step equal to Z. FIG. 4G shows, on the upper line, the first period of the sampled signal between the samples 1 and 100 and, on the lower line, the second period of the sampled signal of FIG. 4F corresponding to the samples 101 to 200.

Visually, the mapping of the portions of the signal corresponding to the periods $T_{ON}$ of the signal to be detected can be noted.

A true correlation value SR will be calculated, by summing, for each sample of rank i, i going from 1 to In−Z, the product B(i).B(i+Z).

Here, the instantaneous correlation value is determined by the product B(i).B(i+Z), i varying from rank 1 to rank In−Z, here equal to 200−100=100.

The value SR is therefore given by the formula $$SR = \sum_{i=1}^{i=In-Z} B(i) \cdot B(i+Z)$$

Consequently, the signal of FIG. 4F will give the values shown in the table below:

| INDEX i | from 1 to 10 | from 11 to 20 | from 21 to 40 | from 41 to 70 | from 71 to 100 |
|---|---|---|---|---|---|
| INDEX i + Z (Z = 100) | from 101 to 110 | from 111 to 120 | from 121 to 140 | from 141 to 170 | from 171 to 200 |
| B (i) . B (i + Z) | 0 × 0 = 0 | 0 × 1 = 0 | 0 × 0 = 0 | 1 × 1 = 1 | 0 × 0 = 0 |
| Number of samples | 10 | 10 | 20 | 30 | 30 |
| Sum of the instantaneous correlations over the interval | 0 | 0 | 0 | 30 | 0 |
| SR | 0 | 0 | 0 | 30 | 0 |

Generally, besides the signal to be detected, the set of signals contains various signals. The latter may for example consist of:

- noise, which may or may not contain parasitic signals of frequency belonging to the filtered and discriminated frequency band,
- periodic signals, where the latter may include signals with frequencies belonging to the said frequency band,
- non-periodic analogue signals, random or not, which may include parasitic signals of frequency belonging to the said frequency band.

In FIG. 4F, the parasitic signals correspond to the samples referenced 111 to 120.

Next, in a correlation measurement step, first of all there is mapped, to each sample of rank i varying from 1 to In, a state value B(i) representing its level, as indicated above.

In the correlation measurement step, during the entire sampling duration, a true correlation value SR is calculated, It should be noted that, in the example illustrated in FIGS. 4A to 4G, a total true correlation value SR of 30 is obtained, coming solely from the processing of the last but one interval.

In a so-called "rate calculation" step, a rate ρ representing the presence of the said frequency is measured over the entire sampling duration.

In this embodiment, the calculation of ρ is carried out by application of the formula:

$$\rho = \sum_{i=1}^{i=In} B(i)/In$$

B(i) representing the state value of the sample of rank i.

In the present example, the sampled signal has a rate ρ equal to 70/200, that is 0.35, insofar as it contains 70 samples of value 1.

Next, in a so-called "theoretical evaluation" step, the determination is carried out of a so-called "theoretical absence mean" value Sabs. According to the particular embodiment, this theoretical absence mean is a function of the rate ρ and varies with it. According to another particular embodiment, during the theoretical evaluation step, the determination is carried out of a so-called "theoretical presence mean" value Spre, which, according to a still more particular embodiment, is also a function of the rate ρ varying with it.

According to the embodiment described, the theoretical absence mean value is determined as being the mean correlation value of a sampled signal having a rate of samples representing the presence of the frequency of the signal to be detected equal to the rate ρ, assuming the absence of the signal to be detected in the said set of signals.

Determination of the theoretical absence mean value Sabs is made, as justified below, according to the formula:

$$Sabs=(In-Z)\rho^2$$

where Z is the number of samples during a period T.

In this example, Sabs=(200−100).(0.35)²=12.25.

According to the same particular embodiment, the theoretical presence mean value Spre is determined as being the mean correlation value of a sampled signal having a rate of samples representing the presence of the frequency of the signal to be detected equal to ρ, assuming the presence of the signal to be detected in the said set of signals.

Determination of the theoretical presence mean value Spre is made, as justified below, according to the formula:

$$Spre=(In-Z)[(ON*(s-\rho)^2/OFF)+\rho^2]$$

in which s is the negative noise, that is to say the probability of detecting the samples delivered during the duration $T_{ON}$, that is here s=0.9

ON is the number of samples during a duration $T_{ON}$, that is here ON=30, OFF is the number of samples during a duration $T_{OFF}$ of <<silence>> between two durations $T_{ON}$, that is here OFF=70.

In this example, $$Spre=(200-100).((30/70)(0.9-0.35)^2+(0.35)^2)=25.2$$

To specify the procedures for determining the above formulae: starting from the assumptions that the set of received signals does not contain the signal which an attempt is being made to detect, but where the discrimination means has detected, over the set of In samples, a rate ρ times the presence of the frequency of the signal to be detected, each sample has the same probability (that is ρ) of corresponding to detection, by the discrimination means, of the frequency of the signal to be detected and the same probability (that is 1−ρ) of corresponding to absence of detection, by the discrimination means, of the frequency of the signal to be detected. The states B(i) and B(i+Z) being independent, the probability that the product B(i).B(i+Z) is equal to 1 is (1−ρ)²+ρ² and the probability that B(i).B(i+Z) is equal to 0 is 2ρ.(1−ρ). By summing these probabilities for all samples of rank from 1 to In−Z, the following is obtained $$Sabs=(In-Z).\rho^2.$$

In the same way, assuming that the signal to be detected is present in the filtered signal, the probability ρ of discriminating the signal to be detected can be divided into:

on the one hand, the probability s of detecting the signal when it is present (during the ON periods) with s approximately equal to 1, for an (ON/ON+OFF) proportion of samples (so-called "negative" noise);

on the other hand, the probability r of detecting the signal when it is absent (during the OFF periods), this presence then being due to the noise for an (OFF/ON+OFF) proportion of samples (so-called "positive" noise);

that is ρ=(s.ON+r.OFF)/Z, with: ON+OFF=Z

In a similar manner to the calculation of Sabs, Spre is obtained:

$$Spre=(In-Z)*[(ON/Z).s^2+(OFF)Z).r^2]$$

with ρ=(s.ON+r.OFF)/Z, that is r=(Z.ρ−s.ON)/OFF thus $Spre=[(In-Z)Z]*[ON.s^2(Z^2.\rho^2+s^2.ON^2-2.Z.\rho.s.ON)/OFF)$ and, since Z=ON+OFF, $$Spre=(In-Z)(s^2.ON/OFF)+Z.\rho^2/OFF-2.ON.\rho.s/OFF)]$$

from which the value of Spre given above is easily deduced.

Finally, in a decision step, the correlation value SR is compared with the theoretical absence mean value Sabs and the theoretical presence mean value, and the presence or absence of the signal to be detected in the set of received signals is deduced from these comparisons.

During the decision step, the true correlation value SR (here equal to 30) is compared with the two theoretical correlation mean values Sabs (here equal to 12.25) and Spre (here equal to 25.2) and the presence or absence of the signal to be detected is deduced from the result of this comparison.

Here, the absolute values of the differences between SR and the theoretical mean values Sabs and Spre are equal respectively to 17.75 and 4.8 and, according to the particular embodiment, it is decided that the signal to be detected is present.

Figure 4H:
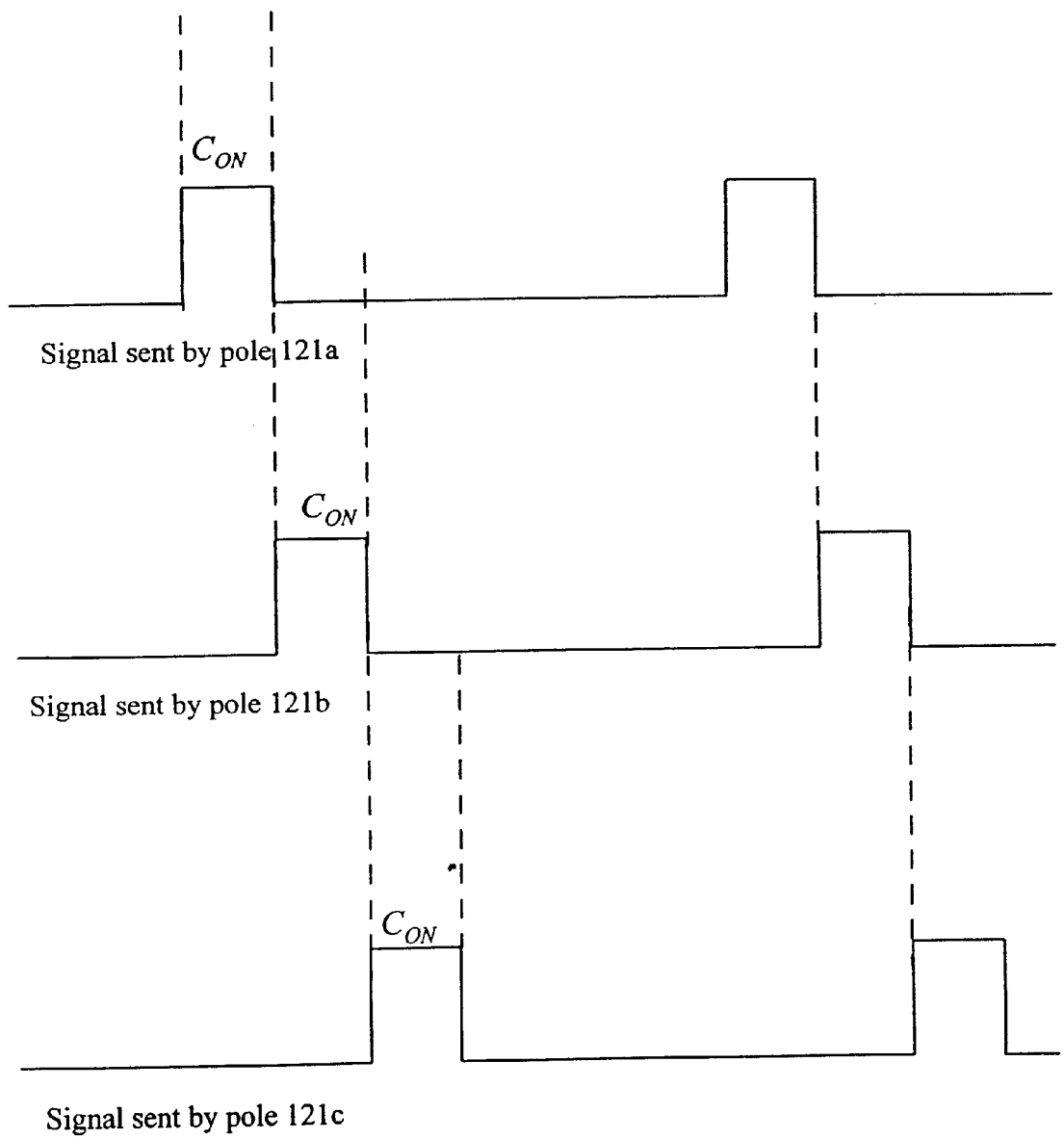

FIG. 4H depicts an example of signals capable of being sent by the poles 121a, 121b and 121c: these signals each have a square envelope. In the example depicted, the durations of the pulses are each equal to Con. At any time, the amplitude of at least two of the three signals is zero.

As to the first and second aspects of the present invention, it should be understood that, on reception of the signals thus sent, a cycle ratio equal to the sum of the cycle ratios of the three signals represents the presence of ink in the three reservoirs, and that below a predetermined cycle ratio, it can be concluded that one of the reservoirs is empty.

Determination of the i-th theoretical presence mean value Spre(i) is carried out by considering that the cycle ratio corresponds to a number i times the cycle ratio of a single signal. For example, for the signal illustrated in FIG. 4H, the cycle ratio α(i) is equal to α(i)=3.i/4 and Spre(i) is calculated by taking account of this cycle ratio value.

Figure 4M:
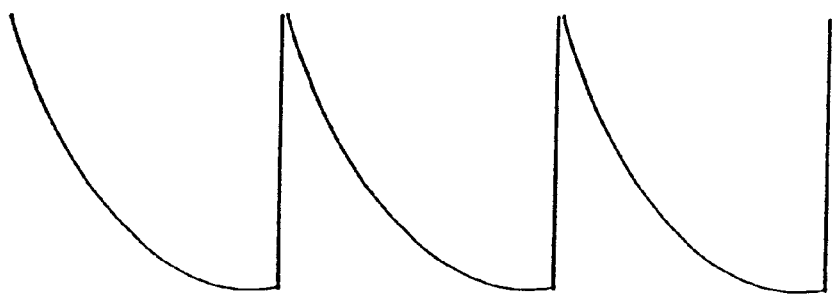

FIG. 4M depicts an example of a signal capable of being sent by the poles 121a, 121b and 121c: this signal has an envelope known as a "sawtooth", with a peak value followed by a continuous non-uniform decrease in slope. The amplitude of this signal is not zero during four fifths of the period T.

As to the third and fourth aspects of the present invention, it will be understood that, on reception of the signals sent, a cycle ratio equal to a predetermined value represents the presence of the maximum quantity of ink in each reservoir, and that, beyond this predetermined cycle ratio, it can be concluded that one of the predetermined levels has been passed.

Figure 5:
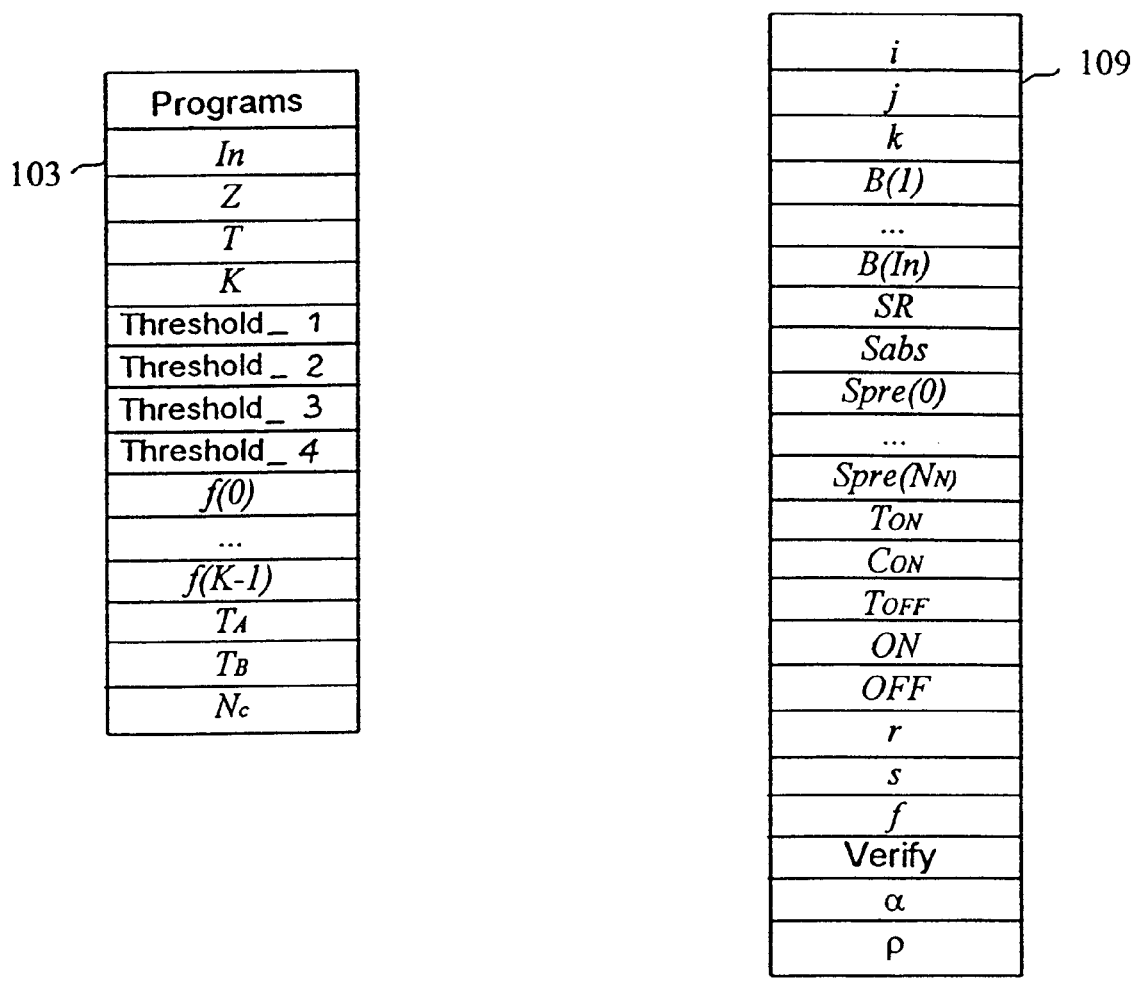
FIG. 5 illustrates the contents of memories incorporated in the device illustrated in FIG. 3A, according to the first and the second aspect of the present invention.

FIG. 5 depicts the detailed contents of the RAM random access memory 109 and the ROM read-only memory 103, in accordance with the first and the second aspects of the present invention):

the random access memory 109 stores the variables k, i, j, r, s, α, $T_{ON}$, $T_{OFF}$, $C_{ON}$, f, ON, OFF, SR, ρ, Sabs, Verify, the variable table Spre(i) containing Nc variables and the variable table B(i), consisting of In variables, in registers which have the same names as the variables they contain, the read-only memory 103 stores the instructions for the calculation means 100, enabling it to execute the steps described with reference to FIGS. 4A to 4E, according to the flow diagrams explained with reference to FIGS. 6 and 7, and the constants necessary for execution of this program, In, Nc, Z. T, $T_A$, $T_B$, K, Threshold__1, Threshold__2, Threshold__3 and Threshold__4, and the frequency table f(k) containing K values, in memory locations having the same names as the constants.

Figure 6A:
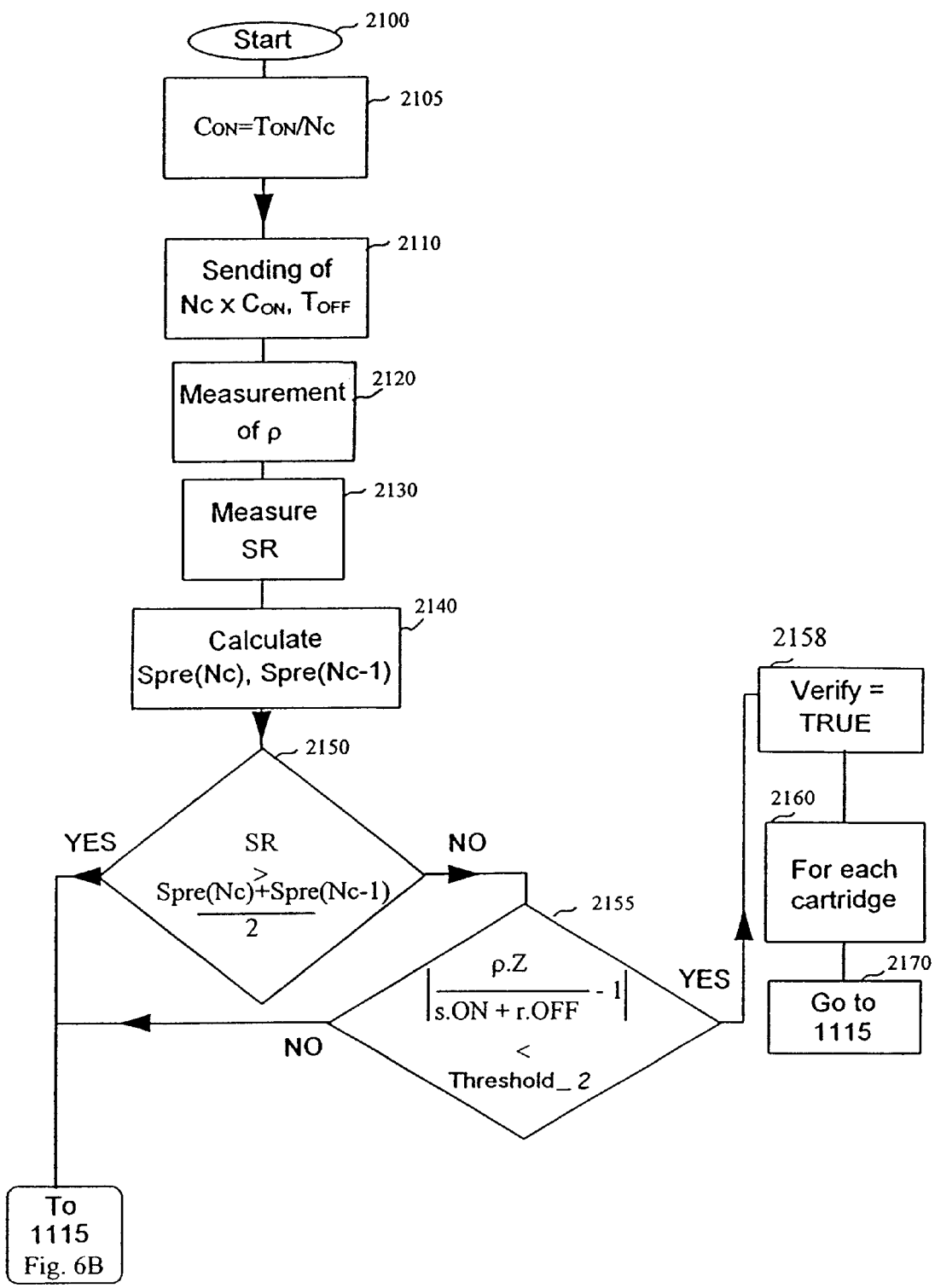
FIG. 6A depicts the end of a flow diagram of a program implemented in accordance with the first and the second aspects of the present invention.

The operation of the processing means will now be described with reference to the flow diagrams of FIGS. 6A, 6B and 7.

Figure 6B:
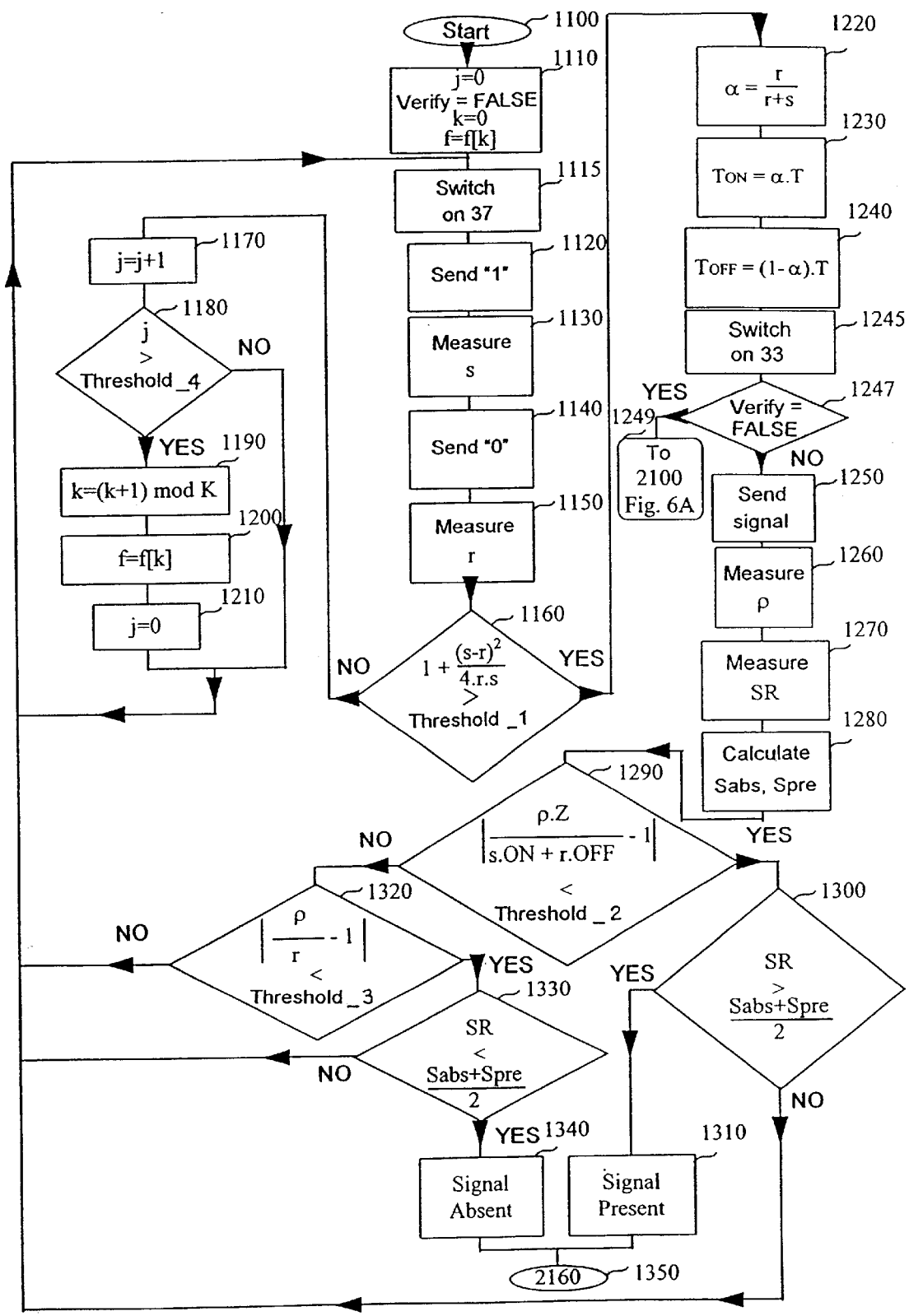
FIG. 6B depicts the start of a flow diagram of a program implemented in accordance with the first and the second aspect of the present invention.

In FIG. 6B, after the start 1100, there is an operation 1110 of initialization, to the numerical value 0, of the variables j and k which represent two counters used solely in the calculations and with no physical significance, of the variable Verify which corresponds to the request for detection of product in each cartridge to the binary logic value "False", and of the variable f to the value f(k).

It should be noted here that the printing device depicted in FIGS. 2A to 3B has cartridge change detection means, not depicted, but of structure and operation known to persons skilled in the art. The variable Verify is then initialized to the binary logic value False when the cartridge has just been changed.

The operation 1115 next consists of positioning the selector 124b so that the signal which reaches the calculation means 100 is the one which was received by the element 122d.

Next, the operation 1120 and the operation 1130 jointly carry out a so-called measurement step for negative noise s. The operation 1120 consists of:

a so-called "negative test sending" step, consisting of the sending, by the elements 121a, 121b and 121c, of a signal having the frequency with an occurrence duration $T_A$, a so-called "negative test listening" step, during which the element 122d receives a set of signals including a signal representing the signal sent during the negative test sending step, a so-called "negative discrimination" step, during which the conversion circuit 115 filters and discriminates the signal sent during the negative test sending step, from the set of signals received during the negative test listening step, and delivers an output signal whose level represents the result of the said discrimination.

The operation 1130 next consists of a so-called "negative sampling" step, during which the calculation means and the clock sample the signal delivered during the negative discrimination step by reading, at each clock pulse during the duration $T_A$, the link between these calculation means and the element 122 under consideration. At the end of the negative sampling step, the calculation means determine a so-called "negative noise" value s as being a function (here identity) of the ratio of the number of samples which correspond to discrimination of the signal during the occurrence duration $T_A$, over the number of samples during the duration $T_A$.

Next, the operation 1140 and the operation 1150 jointly carry out a so-called measurement step for positive noise r. The operation 1140 consists of:

a so-called "silence" step, consisting of the sending, by the elements 121a, 121b and 121c, of no signal, during a duration $T_B$, a so-called "positive test listening" step, during which the element 122d receives a set of signals, a so-called "positive discrimination" step, during which the conversion circuit 115 filters and discriminates the signal sent during the negative test sending step, from the set of signals received during the positive test listening step, and delivers an output signal whose level represents the result of the said discrimination.

The operation 1150 next consists of a so-called "positive sampling" step, during which the calculation means and the clock sample the signal delivered during the positive discrimination step by reading, at each clock pulse during the duration $T_B$, the link between these calculation means and the element 122 under consideration.

At the end of the positive sampling step, the calculation means determine a so-called "positive noise" value r as being a function (here identity) of the ratio of the number of samples which correspond to discrimination of the signal during the duration $T_B$, over the number of samples during the duration $T_B$.

The test 1160 next determines whether:

$$1+(s-r)^2/4.r.s > \text{Threshold}\_1$$

or not. The test 1160 is referred to as a "noise" test, and compares a function of the positive and negative noises with a predetermined value. According to the result of the noise test 1160, the signal transmission step (see operation 1250 below) is or is not performed. This is because this test determines whether the difference between s and r is sufficient for a signal to be discerned. To that end, the value of Threshold__1 is determined as greater than 1 and, for example, equal to 1.15.

It should be noted here that the function compared with the value Threshold__1 during the test 1160 is the value of Spre/Sabs when the cycle ratio is equal to α.

When the result of the test 1160 is negative, the operation 1170 increments the counter j by 1. Next, the test 1180 determines whether or not the counter j is greater than the variable Threshold__4. When the result of the test 1180 is positive, the operation 1190 consists of replacing the value of k by the value of k incremented by 1, calculated modulo K. The operation 1200 consists of taking f=f(k) from the table of K frequencies stored in read-only memory.

The operation 1210 next consists of resetting the value of the counter j to zero. Next, the calculation means return to the operation 1115.

When the result of the test 1160 is positive, the calculation means carry out a so-called "determination" step which consists of the operations 1220, 1230 and 1240, during which physical characteristics of a signal and its detection are determined taking into account the positive and negative noise values.

The operation 1220 consists of determining the cycle ratio a as being equal to the ratio rover r+s.

This is because, as described above, a correlation measurement SR is going to be compared with two theoretical correlation mean values respectively related to an assumption of signal absence (Sabs) and an assumption of signal presence (Spre) in order to determine whether SR is closer to the value Sabs or the value Spre and to thereby deduce whether the signal is present or not, and, consequently, whether the event is present or not.

It is therefore preferable that the values Spre and Sabs are as different as possible, that is to say, their ratio is as large as possible.

The cycle ratio $\alpha$ being defined as equal to ON/Z, this gives: ON=$\alpha$.Z and OFF=(1−$\alpha$).Z.

Therefore Spre/Sabs=1+[($\alpha$.(s−$\rho$)$^2$)/((1−$\alpha$).$\rho^2$)]

Knowing that $\rho$=(s.ON+r.OFF)/Z,

Spre/Sabs=1+($\alpha$.(s−r)$^2$.(1−$\alpha$)$^2$)/(1−$\alpha$)((s−r).$\alpha$+r)$^2$ Let U=s−r, the derivative of Spre/Sabs as a function of $\alpha$ is equal to:

$$(Spre/Sabs)'(\alpha)=U^2(U.\alpha+r).(r-(2.r+U).\alpha)/(U.\alpha+r)^4$$

This derivative is zero when $\alpha$=r/r+s.

The operation 1230 consists of determining the signal occurrence duration $T_{ON}$=$\alpha$T. The operation 1240 consists of determining the signal absence duration $T_{OFF}$=(1−$\alpha$)T.

The operation 1245 next consists of positioning the selector 124b so that the signal which reaches the calculation means 100 is the one which was received by one of the elements 122a, 122b or 122c.

The test 1247 next consists of determining whether or not the variable Verify has the binary logic value False. When the result of the test 1247 is negative, the operation 1250 is carried out. Otherwise, the operation 1249 is carried out.

The operation 1250 next consists of a so-called "transmission" step, during which the calculation means control the sending, by the element 121 of the reservoir under consideration (see operation 2160, FIG. 6A), of a signal having a pulse with a cycle ratio equal to $\alpha$, and a frequency f, and the selector 124b receives a signal representing the signal sent.

The operation 1260 consists of a so-called "detection discrimination" step, during which the conversion circuit 115 filters and discriminates the signal sent from the set of received signals and delivers an output signal, the level of which represents the result of this discrimination, and a so-called "detection sampling" step, during which the calculation means and the clock sample the level thus obtained in In signal samples spread over a duration greater than a repetition period T, here of two periods T.

The operation 1260 also consists of a so-called "rate calculation" step, during which the calculation means measure, over at least part of the sampling duration, the rate $\rho$ of samples whose level represents the presence of the said signal, this rate $\rho$ being the ratio of the number of samples whose level represents the presence of the signal to be detected, over the total number of samples in the said part of the sampling duration.

The operation 1270 next consists of a so-called "correlation measurement" step, during which the calculation means map, to each sample of rank i varying from 1 to In, a state value B(i) representing its level and calculates, during at least part of the sampling duration, a true correlation value SR, by summing, for each pair of samples of ranks i and i+Z, the instantaneous value of correlation between the state value B(i) and the state value B(i+Z), the samples of ranks i and i+Z being located at instants displaced by a period T.Z being the number of samples taken during a period T of the signal to be detected.

The operation 1280 next consists of a so-called "theoretical evaluation" step, during which determination of the so-called "theoretical absence mean" value Sabs and "theoretical presence mean" value Spre is carried out, using at least one of the positive or negative noises. Here the theoretical presence correlation mean value is equal to:

$$Spre=(In-Z)[(ON^*(s-\rho)^2/OFF)+\rho^2]$$

in which:

s is the negative noise,

ON is the number of samples during a duration $T_{ON}$

OFF is the number of samples during a duration $T_{OFF}$ of <<silence>> between two durations $T_{ON}$ that is, therefore: ON=$\alpha$Z=r.Z/(r+s)

and OFF=(1−$\alpha$)Z=s.Z/(r+s), r being the positive noise.

Next, the calculation means perform the so-called "rate consistency" test 1290, during which they compare a function of the rate $\rho$ of samples whose level represents the presence of the said signal, with a predetermined value Threshold_2: if the absolute value of [(($\rho$.Z/(s.ON+r.OFF))−1] is less than the predetermined value Threshold_2, the test 1300 is performed, otherwise, the test 1320 is performed. For example, the value of Threshold_2 is 0.4.

The test 1300 determines whether or not the value of SR is greater than the mean value of Sabs and Spre. When the result of the test 1300 is negative, the operation 1115 is reiterated. When the result of the test 1300 is positive, the calculation means decide, during the decision step, that the signal is present, and process the presence information during the operation 1310 which may consist of remote sending, storing in random access memory or processing of data, for example.

The test 1320, which is performed when the result of the test 1290 is negative, is referred to as a "rate consistency" test. During this test, the calculation means compare a function of the rate $\rho$ of samples whose level represents the presence of the said signal, with a predetermined value Threshold_3: if the absolute value of [($\rho$/r)−1] is less than the predetermined value Threshold_3, the test 1330 is performed, otherwise the operation 1115 is reiterated.

The test 1330 determines whether or not the value of SR is less than the mean value of Sabs and Spre. When the result of the test 1330 is negative, the operation 1115 is reiterated. When the result of the test 1330 is positive, the calculation means decide, during the decision step 1330, that the signal is absent, and process the presence information during the operation 1340, which may consist of remote sending, storing in random access memory or processing of data, for example.

It should be noted that:

according to the result of the rate consistency test 1290, the decision step 1300 is performed or not performed, and according to the result of the rate consistency test 1320, the decision step 1330 is performed or not performed.

following one of the processing operations 1310 or 1340, the operation 2160 (FIG. 6A) is performed.

When the result of the test 1247 is positive, the operation 2105 (FIG. 6A) consists of calculating the value of $C_{ON}$=$T_{ON}$/Nc.

The operation 2110 next consists of the sending, by each of the elements 121, of a signal as illustrated in FIG. 4H, the presence duration of which is $C_{ON}$. The three elements 121 therefore each send a square signal of duration $C_{ON}$ in such a way that at any time at least two of the elements 121 send no signal.

During the operation 2110, the receiver 124b receives a set of so-called "received" signals possibly including a signal representing the signal sent.

The operation 2120 consists of a so-called "detection discrimination" step, during which the calculation means filter and discriminate the signal sent from the set of received signals and deliver an output signal whose level represents the result of this discrimination, and a so-called "detection sampling" step, during which the calculation means 100 and the clock sample the level thus obtained in In signal samples spread over a duration greater than a repetition period T, here of two periods T.

The operation 2120 next consists of a so-called "rate calculation" step, during which the calculation means 100 measure, over at least part of the sampling duration, the rate $\rho$ of samples whose level represents the presence of the said signal, this rate $\rho$ being the ratio of the number of samples whose level represents the presence of the signal to be detected, over the total number of samples in the said part of the sampling duration.

The operation 2130 next consists of a so-called "correlation" step, during which the calculation means 100 map, to each sample of rank i varying from 1 to In, a state value B(i) representing its level and calculate, during at least part of the sampling duration, a true correlation value SR, by summing, for each pair of samples of ranks i and i+Z, the instantaneous value of correlation between the state value B(i) and the state value B(i+Z), the samples of ranks i and i+Z being located at instants displaced by a period T, Z being the number of samples taken during a period T of the signal to be detected.

The operation 2140 next consists of a so-called "theoretical evaluation" step, during which the calculation means 100 carry out determination of the Nc so-called "theoretical presence mean" values Spre(i), taking into account the cycle ratios corresponding to i signals sent by the elements 121a, 121b and 121c, and of the theoretical absence mean Sabs.

Next, the calculation means 100 perform the test 2150, which consists of verifying that SR is greater than the mean of Spre(Nc) and Spre(Nc−1), Nc being the number of reservoirs. When the result of the test 2150 is positive, which means that all the reservoirs contain ink, the operation 1115 is reiterated.

When the result of the test 2150 is negative, that is to say when it has been assumed that at least one of the reservoirs is empty, the calculation means perform the so-called "rate consistency" test 2155, during which they compare a function of the rate $\rho$ of samples whose level represents the presence of the said signal, with a predetermined value Threshold_2: if the absolute value of $[((\rho.Z/(s.ON+r.OFF))-1]$ is less than the predetermined value Threshold_2, the operation 2158 is performed, otherwise the operation 1115 is reiterated.

The operation 2158 consists of assigning the binary logic value "True" to the variable Verify. The operation 2160 next consists of taking the next among the Nc reservoirs: coming from the operation 2158, it is the first reservoir which is considered, and, each time the operation 2160 is reiterated, the number of the reservoir considered is incremented.

Next, the operation 1115 is reiterated (operation referenced 2170).

Figure 7:
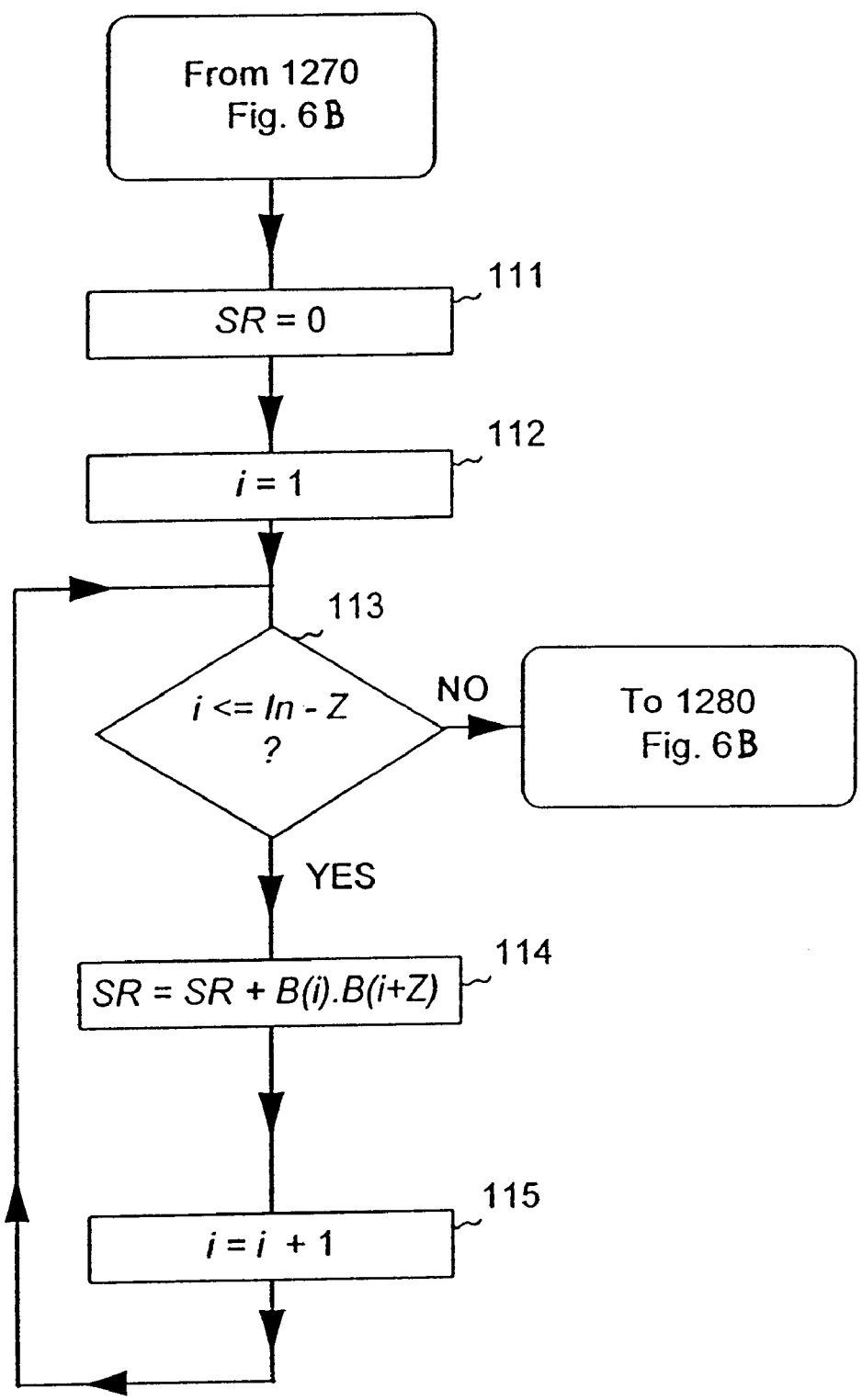
FIG. 7 depicts a detailed part of the flow diagram of FIG. 6B, of the flow diagram of FIG. 9A and of FIG. 11 (see below)
Figure 9A:
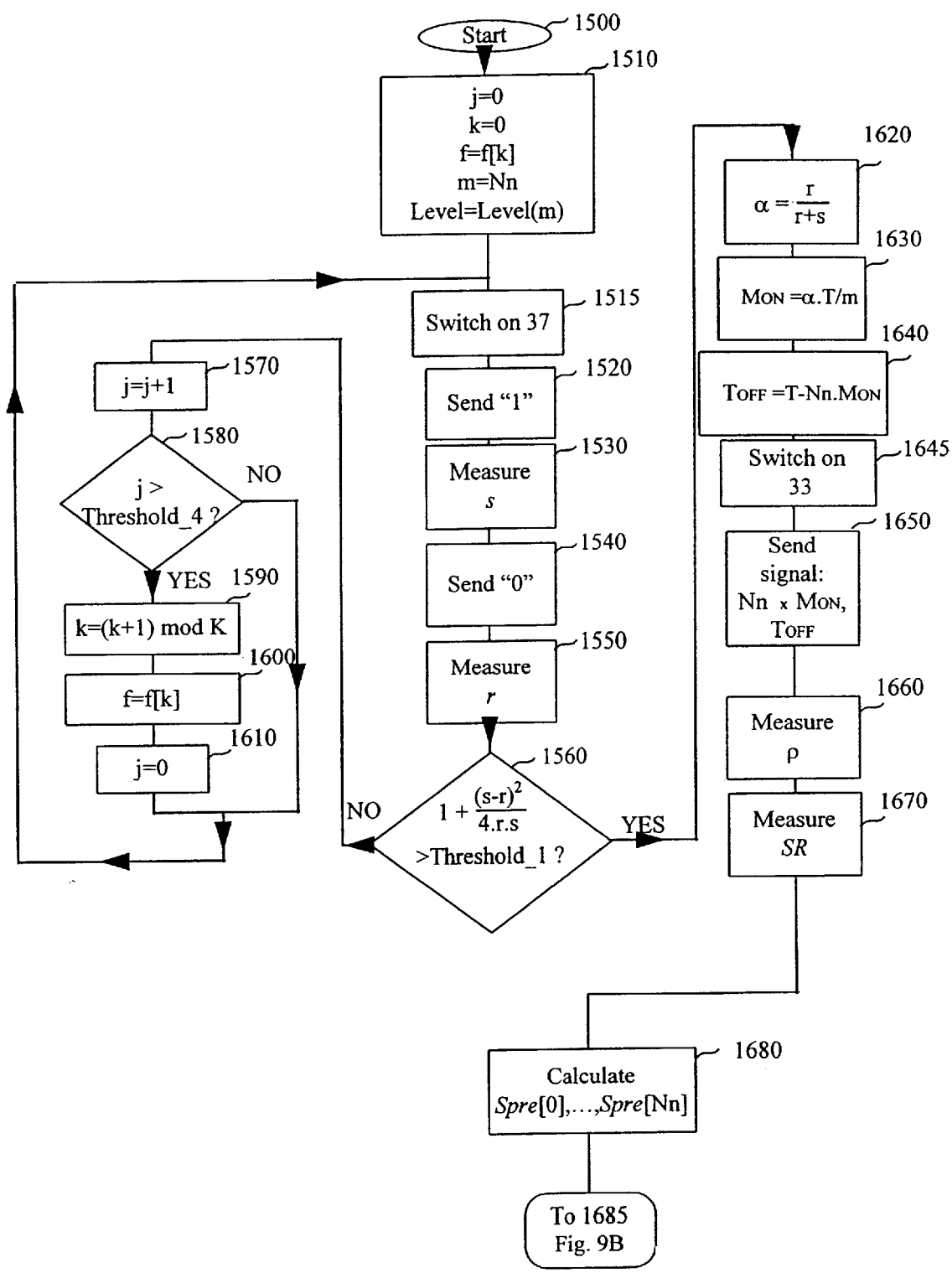
FIG. 9A depicts the start of a flow diagram of a program implemented in accordance with the third and fourth aspects of the present invention.
Figure 11:
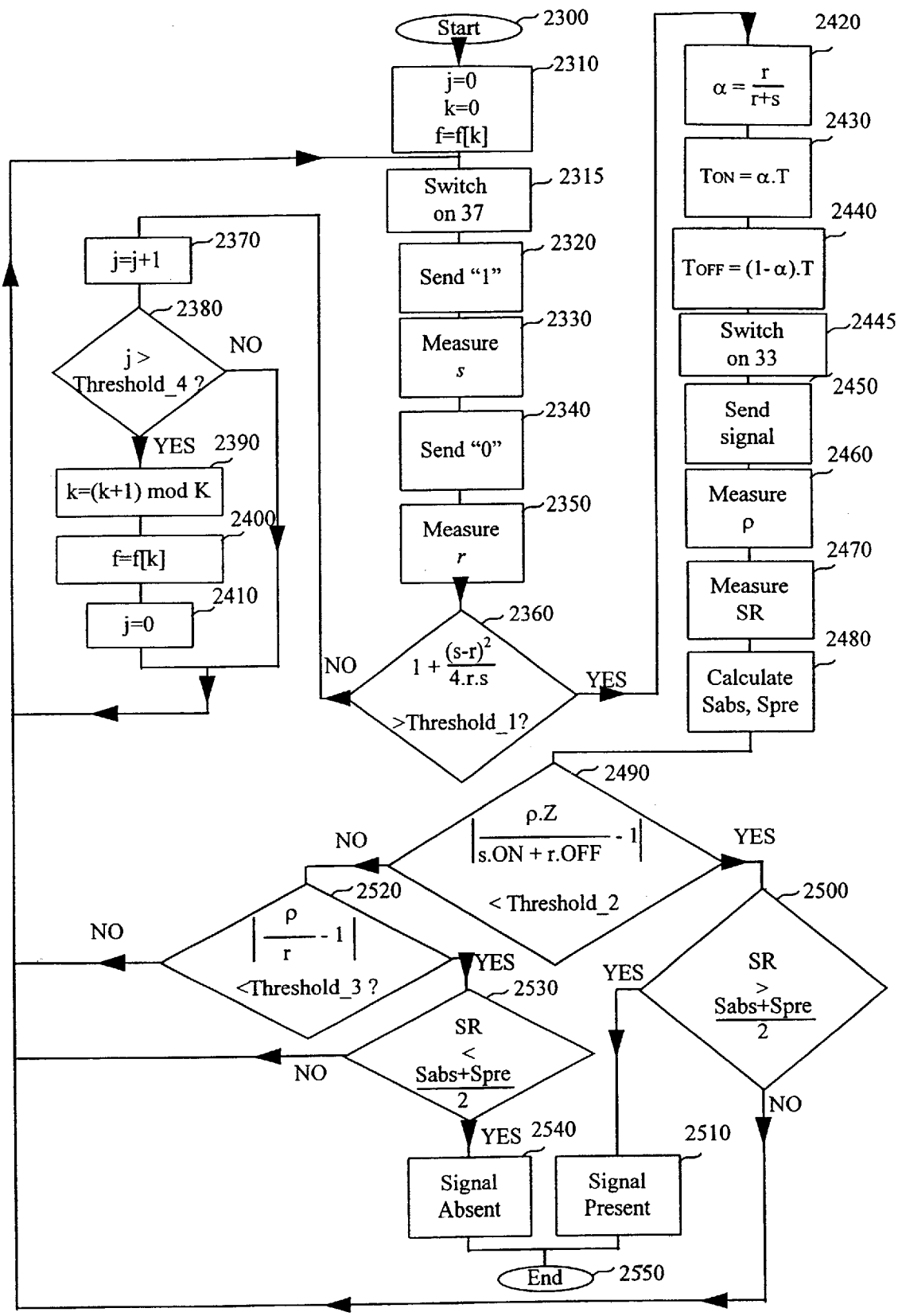
FIG. 11 depicts a flow diagram of a program implemented in accordance with the fifth and the sixth aspects of the present invention.

FIG. 7 details the measurement of SR (FIGS. 6B, 9A and 11). The operation 111 consists of setting, to the value 0, the variable SR contained in a register SR of the random access memory 109. The operation 112 consists of resetting the variable i to the value 1.

The test 113 consists of testing whether the variable i is less than or equal to the value In−Z, Z being a constant stored in the read-only memory 103. Where this test 113 gives a negative result, the calculation means perform the operation 1280 (FIG. 6) described above. Where the test 113 gives a positive result, the operation 114 consists of increasing the value of the variable SR by the instantaneous correlation product, that is to say, in this embodiment, the product of the value of the variable B(i) and the value of the variable B(i+Z). The operation 115 increments the value of the variable i. The calculation means then return to the test 113. The loop from the test 113 to the operation 115 carries out calculation of the true correlation SR.

Of course, the present invention is in no way limited to the embodiments described with the help of the figures, but on the contrary encompasses any variant within the capability of persons skilled in the art.

In particular, the value of SR can be directly used as a measurement of the ink level.

FIG. 4N depicts an example of a signal capable of being sent by one of the poles 121a, 121b and 121c with a view to measuring the quantity of product present in the reservoir facing the said pole: this signal has an envelope with, successively, different constant amplitude values, values which decrease successively. This signal is called a "staircase signal" and each of the periods during which the amplitude of the envelope is non-zero and constant is called a "tread" or "stair tread".

In the example depicted, three treads are shown, with identical durations equal to $M_{ON}$ and the successive amplitudes are decreasing by one-third of the peak amplitude.

The i-th theoretical presence mean value Spre(i) is determined by considering that the signal received corresponds to i treads of the signal sent.

Figure 8:
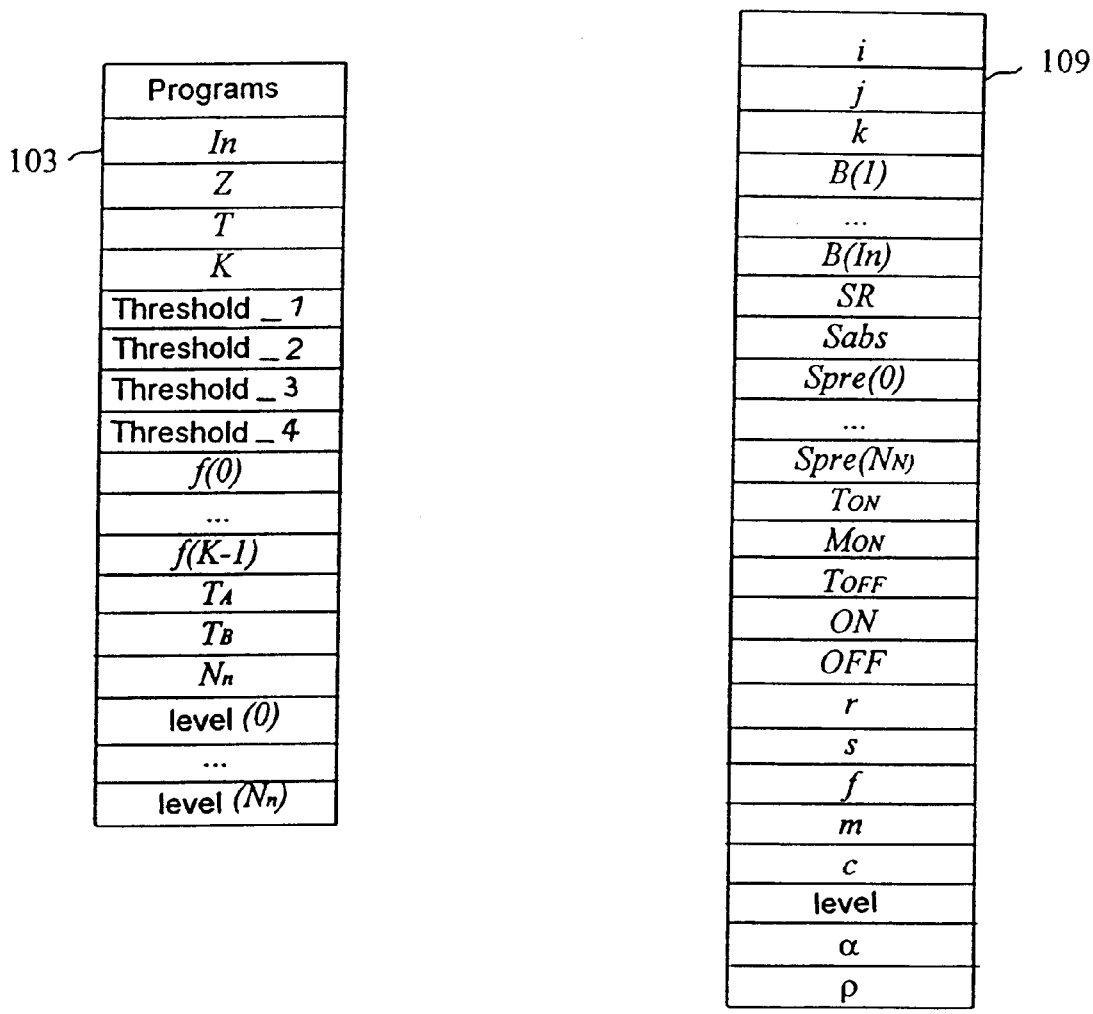
FIG. 8 illustrates the contents of memories incorporated in the device illustrated in FIG. 3A, in accordance with the third and fourth aspect of the present invention.
Figure 9B:
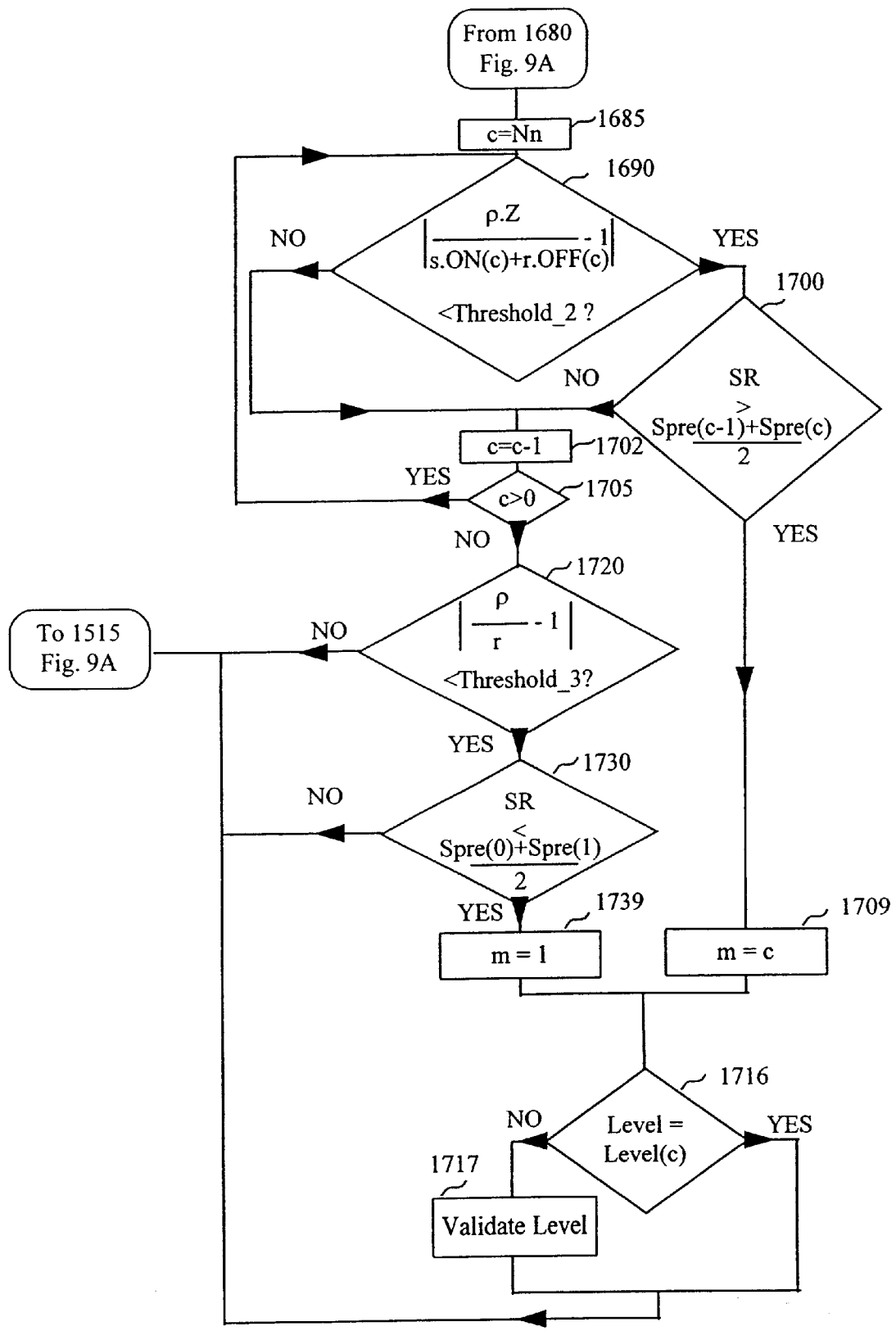
FIG. 9B depicts the end of a flow diagram of a program implemented in accordance with the third and fourth aspects of the present invention.

FIG. 8 depicts the detailed contents of the RAM random access memory 109 and the ROM read-only memory 103 (in accordance with the flow diagrams of FIGS. 9A, 9B and 7, corresponding to the third and fourth aspects of the present invention):

the random access memory 109 stores the variables i, j, k, f, r, s, $\alpha$, $T_{ON}$, $M_{ON}$, $T_{OFF}$, ON, OFF, SR, M, C, level $\rho$, Sabs, the variable table Spre(i) containing Nc variables and the variable table B(i), consisting of In variables, in registers which have the same names as the variables they contain, the read-only memory 103 stores the instructions for the calculation means 100, enabling it to execute the steps described with reference to FIGS. 4A to 4E, according to the flow diagrams presented with reference to FIGS. 9A, 9B and 7, and the constants necessary for execution of this program, In, Nn, Z, T, $T_A$, $T_B$, K, Threshold_1, Threshold_2, Threshold_3 and Threshold_4, and the frequency table f(k) containing K values and the level table level ($N_n$, containing $N_n$ values, in memory locations having the same names as the constants.

A description will now be given of the operation of the calculation means with reference to the flow diagrams in FIGS. 9A, 9B and 7, which concern the measurement of a quantity of product in a single reservoir (third and fourth aspects of the present invention).

FIG. 9A shows, after the start 1500, an operation 1510 of initializing at the numerical value 0 variables j and k which represent two counters solely used in the calculations and without any physical significance, of initializing at the value f(k) the value of the variable f representing the frequency of initialization at the value Nn, that is to say at the number of treads of the signal sent, of the variable m, which represents the presumed number of treads in the signal sent which will be represented in the signal received by samples of value 1, and at the value level(m), the variable level which represents the last ink level measured and validated in the reservoir in question.

It should be noted here that the printing device depicted in FIGS. 2A to 3B has means of detecting a change of cartridge which are not shown but which have a structure and functioning known to persons skilled in the art. The variables m and level are then reinitialized as indicated in operation 1510 each time a new cartridge is installed.

The operation 1515 next consists of positioning the selector 124 b so that the signal which reaches the calculation means 100 is the one which was received by the element 122d.

Next, the operation 1520 and the operation 1530 jointly carry out a so-called measurement step for negative noise s. The operation 1520 consists of:

- a so-called "negative test sending" step, consisting of the sending, by the elements 121a, 121b and 121c, of a signal having the frequency f with an occurrence duration $T_A$,
- a so-called "negative test listening" step, during which the element 122d receives a set of signals including a signal representing the signal sent during the negative test sending step,
- a so-called "negative discrimination" step, during which the conversion circuit 115 filters and discriminates the signal sent during the negative test sending step, from the set of signals received during the negative test listening step, and delivers an output signal whose level represents the result of the said discrimination, The operation 1530 next consists of a so-called "negative sampling" step, during which the calculation means and the clock sample the signal delivered during the negative discrimination step by reading, at each clock pulse during the duration $T_A$, the link between these calculation means and the element 122 under consideration. At the end of the negative sampling step, the calculation means determine a so-called "negative noise" value s as being a function (here identity) of the ratio of the number of samples which correspond to discrimination of the signal during the occurrence duration $T_A$, over the number of samples during the duration $T_A$.

Next, the operation 1540 and the operation 1550 jointly carry out a so-called measurement step for positive noise r. The operation 1540 consists of:

- a so-called "silence" step, consisting of the sending, by the elements 121a, 121b and 121c, of no signal, during a duration $T_B$,
- a so-called "positive test listening" step, during which the element 122d receives a set of signals,
- a so-called "positive discrimination" step, during which the conversion circuit 115 filters and discriminates the signal sent during the negative test sending step, from the set of signals received during the positive test listening step, and delivers an output signal whose level represents the result of the said discrimination.

The operation 1550 next consists of a so-called "positive sampling" step, during which the calculation means and the clock sample the signal delivered during the positive discrimination step by reading, at each clock pulse during the duration $T_B$, the link between these calculation means and the element 122 under consideration.

At the end of the positive sampling step, the calculation means determine a so-called "positive noise" value r as being a function (here identity) of the ratio of the number of samples which correspond to discrimination of the signal during the duration $T_B$, over the number of samples during the duration $T_B$.

The test 1560 next determines whether:

$$1+(s-r)^2/4.r.s > \text{Threshold\_1}$$

or not. The test 1560 is referred to as a "noise" test, and compares a function of the positive and negative noises with a predetermined value. According to the result of the noise test 1560, the signal transmission step (see operation 1650 below) is or is not performed. This is because this test determines whether the difference between s and r is sufficient for a signal to be discerned. To that end, the value of Threshold\_1 is determined as greater than 1 and, for example, equal to 1.15.

It should be noted here that the function compared with the value Threshold\_1 during the test 1560 is the value of Spre/Sabs when the cycle ratio is equal to $\alpha$.

Here, the first term of the inequality is equal to 1.17 and the result of the test is therefore positive. When the result of the test 1560 is negative, the operation 1570 consists of incrementing the counter j by 1. Next, the test 1580 determines whether or not the counter j is greater than the variable Threshold\_4. When the result of the test 1580 is positive, the operation 1590 consists of replacing the value of k by the value of k incremented by 1, calculated modulo K. The operation 1600 consists of taking f=f(k) from the table of K frequencies stored in read-only memory.

The operation 1610 next consists of resetting the value of the counter j to zero. Next, the calculation means return to the operation 1515.

When the result of the test 1560 is positive, the calculation means carry out a so-called "determination" step which includes the operations 1620, 1630 and 1640, during which they determine physical characteristics of a signal and its detection are determined taking into account the positive and negative noise values.

The operation 1620 consists of determining the cycle ratio $\alpha$ as being equal to the ratio r over r+s.

This is because, as described above, a correlation measurement SR is going to be compared with two theoretical correlation mean values respectively related to an assumption of signal absence (Sabs) and an assumption of signal presence (Spre) in order to determine whether SR is closer to the value Sabs or the value Spre and to thereby deduce whether the signal is present or not, and, consequently, whether the event is present or not.

It is therefore preferable that the values Spre and Sabs are as different as possible, that is to say, their ratio is as large as possible.

The cycle ratio $\alpha$ being defined as equal to ON/Z, this gives: ON=$\alpha$.Z and OFF=$(1-\alpha)$.Z.

Therefore Spre/Sabs=$1+[(\alpha.(s-\rho)^2)((1-\alpha).\rho^2)]$

Knowing that $\rho$=(s.ON+r.OFF)/Z,

Spre/Sabs=$1+(\alpha.(s-r)^2.(1-\alpha)^2)/(1-\alpha)((s-r).\alpha+r)^2$

Let U=s−r, the derivative of Spre/Sabs as a function of a is equal to:

$$(Spre/Sabs)'(\alpha) = U^2(U.\alpha+r).(r-(2.r+U).\alpha)/(U.\alpha+r)^4$$

This derivative is zero when $\alpha$=r/r+s.

The operation 1630 consists of determining the duration $M_{ON}$ of each of the m treads which it is presumed that the signal received will represent:

$$M_{ON} = \alpha.T/m.$$

The operation 1640 consists of calculating the duration of absence of the signal sent: $T_{OFF}$=T−Nn.$M_{ON}$.

The operation 1645 next consists of positioning the selector 124b so that the signal which reaches the calculation means 100 is that which was received by one of the elements 122a, 122b or 122c.

The operation 1650 next consists of a so-called "transmission" step, during which the calculation means control the sending, by the element 121 corresponding to the reservoir on which the measurement was made, of a signal having the physical characteristics determined during the determination step and, in particular, Nn treads of durations $M_{ON}$ and the frequency f, as illustrated in FIG. 4N.

During the operation 1650, the element 122 which faces the element 121 which performed the sending of the signal receives a set of so-called "received" possibly including a signal representing the signal sent.

The operation 1660 consists of a so-called "detection discrimination" step, during which the conversion circuit 115 filters and discriminates the signal sent from the set of received signals and delivers an output signal, the level of which represents the result of this discrimination, and a so-called "detection sampling" step, during which the calculation means and the clock sample the level thus obtained in In signal samples spread over a duration greater than a repetition period T, here of two periods T.

The operation 1660 also consists of a so-called "rate calculation" step, during which the calculation means measure, over at least part of the sampling duration, the rate ρ of samples whose level represents the presence of the said signal, this rate ρ being the ratio of the number of samples whose level represents the presence of the signal to be detected, over the total number of samples in the said part of the sampling duration.

The operation 1670 next consists of a so-called "correlation measurement" step, during which the calculation means map, to each sample of rank i varying from 1 to In, a state value B(i) representing its level and calculates, during at least part of the sampling duration, a true correlation value SR, by summing, for each pair of samples of ranks i and i+Z, the instantaneous value of correlation between the state value B(i) and the state value B(i+Z), the samples of ranks i and i+Z being located at instants displaced by a period T, Z being the number of samples taken during a period T of the signal to be detected.

The operation 1680 next consists of a so-called "theoretical evaluation" step, during which determination of the so-called "theoretical absence mean" value Sabs=Spre (0) and "theoretical presence mean" value Spre (c), where c can take a value between 1 and $N_a$, is carried out, using at least one of the positive or negative noises. Here the theoretical presence correlation mean value is equal to:

$$Spre=(In-Z)[(ON(c)*(s-\rho)^2/OFF(c))+\rho^2]$$

in which:
ON(c)=c.$M_{ON}$
OFF(C)=T−ON(c)
and s is the negative noise,

The operation 1685 (FIG. 9B) consists of initializing the value of the counter c at the value stored in the read only memory Nn.

Next, the calculation means perform the so-called "rate consistency" test 1690, during which:
they calculate the value of the variable ON(c)=C.$M_{ON}$ and the value of the variable OFF(c)=T−ON(c),
they compare a function of the sample rate ρ whose level represents the presence of the said signal with a predetermined value Threshold_2: if the absolute value of [((p.Z/(s.ON(c)+r.OFF(c)))−1] is less than the predetermined value Threshold_2, the test 1700 is performed, otherwise it is the operation 1702 which is performed.

The test 1700 determines whether or not the value of SR is greater than the mean value between Spre(c) and Spre(c−1), When the result of the test 1700 is negative, the operation 1702 is performed. When the result of the test 1700 is positive, the calculation means decide, during the decision step, that the signal received represents a number c of treads of the signal sent, and, consequently, assign to the variable m a new value equal to c, during the operation 1709.

The test 1716 next determines whether or not the variable level is equal to the value level(c). When the result of the test 1716 is positive, the operation 1515 is reiterated. When the result of the test 1716 is negative, the operation 1717 consists of counting, by means of a counter, not shown, the number of successive tests 1700 which give the value level(c) and, when this number is greater than a predetermined value, of modifying the value of the variable level in order to allocate to it the value level(c). The operation 1717 also consists of displaying the value of the variable level and, optionally, triggering an alarm signal when the product level is the lowest level that can be detected.

The operation 1702 consists of decrementing the value of the variable c by 1. The test 1705 determines whether or not the variable c is strictly greater than zero. When the result of the test 1705 is positive, the test 1690 is reiterated.

When the result of the test 1705 is negative, during the so called "rate consistency test" 1720, the calculation means 100 compare a function of the sample rate ρ whose level represents the presence of the said signal with a predetermined value Threshold_3: if the absolute value of [(ρ/r)−1] is less than the predetermined value Threshold_3, the test 1730 is performed, otherwise the operation 1515 is reiterated.

The test 1730 determines whether of not SR is less than the mean value between Spre(0) and Spre(1). When the result of the test 1730 is negative, the operation 1515 is reiterated.

It should be noted that:
according to the result of the rate consistency test 1690, the decision step 1700 is or is not performed, and
according to the result of the rate consistency test 1720, the decision step 1730 is performed or not performed.

When the result of the test 1730 is positive, the operation 1739 consists of giving the value 1 to the variable m. Next, the test 1716 is performed, as described above.

When considered as a part of the flow diagram of FIG. 9A, the description of FIG. 7 should be amended as follows:
"from 1270 FIG. 6B" should read "from 1670 FIG. 9A", and
"to 1280 FIG. 6B" should read "to 1680 FIG. 9A".

Figure 10:
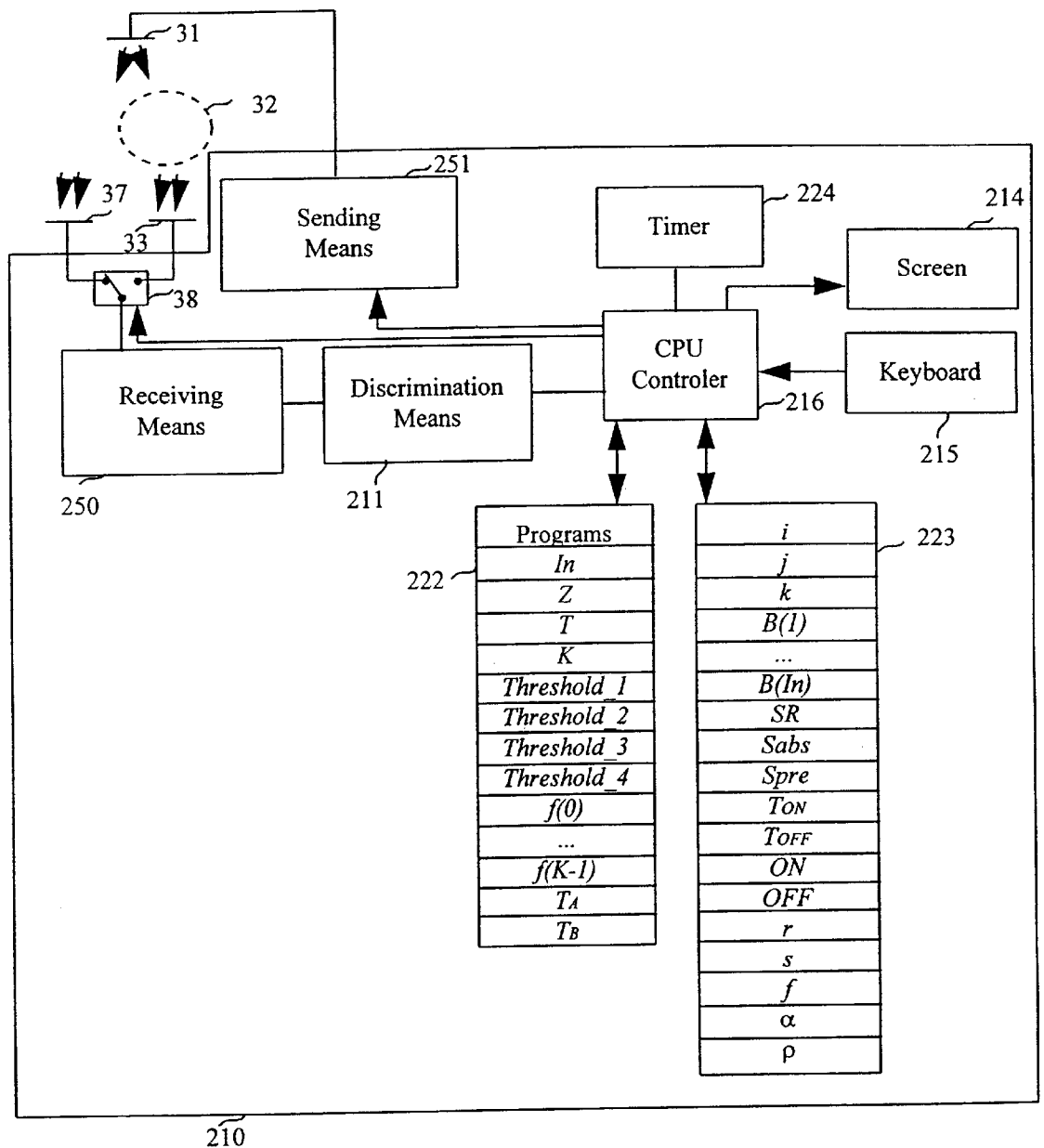
FIG. 10 illustrates a block diagram of a device implementing the fifth and the sixth aspects of the present invention.

FIG. 10 depicts a device according to the fifth and sixth aspects of the present invention. In this figure characteristic elements are found which are necessary for the operation of the device according to the invention:
a signal sender 31, here in the form of an antenna emitting radiation, knowing that the signal can also be conveyed by a material constituting a transmission channel, which sends a signal which is supplied to it by a sending means 251, the said sending means modulating a carrier signal by means of an envelope,
a first signal receiver 33 which receives the signal sent by the sender 31, optionally affected by an event 32 and by parasitic signals (not shown),
a second signal receiver 37, positioned so that it receives on the one hand the signal sent by the sender 31 without the said signal being able to be affected by the event 32, and on the other hand the parasitic signals, a switch 38, which receives the signals coming from the two signal receivers 33 et 37 but, as a function of a signal which it receives from calculation means 216 described below, transmits only one of these signals to a receiving means 250, which filters the signal able to be sent by the sender 31, et an electronic circuit 210 including:

calculation means 216, consisting for example of a microcontroller;

storage means including a random access memory 223 and a read only memory 222, connected to the calculation means 216.

a timer 224 connected to the calculation means 216, consisting for example of a clock and a frequency divider, supplying electrical pulses to the calculation means 216, and, connected electrically to the calculation means 216:

a keypad 215 designed to receive commands from the user and a screen 214 designed to display operating messages;

a discrimination means 211 consisting of a passband filter centered on the frequency of the signal to be detected, a filter associated with an analogue to digital converter or a threshold circuit, and connected to a signal receiver 250, and a sender 251 connected to the controller 216.

In the random access memory 223, there are stored the variables i, k, f, r, S, α, $T_{ON}$, $T_{OFF}$, ON, OFF, SR, ρ, Sabs, Spre, the table of variables B(i), including In variables, in registers which bear the same names as the variables which they contain. The read-only memory 222 stores the instructions for the calculation means 216, enabling it to execute the steps described with reference to FIGS. 4A to 4G, according to the flow diagrams explained with reference to FIGS. 11 and 7, and the constants necessary for execution of this program, In, $T_A$, $T_B$, Z, T, K, Threshold_1, Threshold_2, Threshold_3 and Threshold_4, and the frequency table f(k) containing a number of frequencies K, in memory locations having the same names as the constants;

According to the fifth and the sixth aspects of the invention described as an example with regard to FIGS. 4A to 4G, 10, 11 and 7, the theoretical absence mean value is determined as being the mean correlation value of a sampled signal having a rate of samples representing the presence of the frequency of the signal to be detected equal to the rate ρ, assuming the absence of the signal to be detected in the said set of signals.

Determination of the theoretical absence mean value Sabs is made, as justified below, according to the formula:

$$Sabs=(In-Z)\rho^2$$

where Z is the number of samples during a period T.

In this example, $Sabs=(200-100).(0.35)^2=12.25$

According to the same particular aspect of the invention, the theoretical presence mean value Spre is determined as being the mean correlation value of a sampled signal having a rate of samples representing the presence of the frequency of the signal to be detected equal to ρ, assuming the presence of the signal to be detected in the said set of signals.

Determination of the theoretical presence mean value Spre is made, as justified below, according to the formula:

$$Spre=(In-Z)[(ON*(s-\rho)^2/OFF)+\rho^2]$$

in which s is the negative noise, that is to say the probability of detecting the samples delivered during the duration $T_{ON}$, that is here s=0.9

ON is the number of samples during a duration $T_{ON}$, that is here ON=30, OFF is the number of samples during a duration $T_{OFF}$ of <<silence>> between two durations $T_{ON}$, that is here OFF=70.

In this example, $$Spre=(200-100).((30/70)(0.9-0.35)^2+(0.35)^2)=25.2$$

To specify the procedures for determining the above formulae: starting from the assumptions that the set of received signals does not contain the signal which an attempt is being made to detect, but where the discrimination means has detected, over the set of In samples, a rate ρ times the presence of the frequency of the signal to be detected, each sample has the same probability (that is ρ) of corresponding to detection, by the discrimination means, of the frequency of the signal to be detected and the same probability (that is 1−ρ) of corresponding to absence of detection, by the discrimination means, of the frequency of the signal to be detected. The states B(i) and B(i+Z) being independent, the probability that the product B(i).B(i+Z) is equal to 1 is $(1-\rho)^2+\rho^2$ and the probability that B(i).B(i+Z) is equal to 0 is 2ρ.(1−ρ). By summing these probabilities for all samples of rank from 1 to In−Z, the following is obtained $$Sabs=(In-Z).\rho^2.$$

In the same way, assuming that the signal to be detected is present in the filtered signal, the probability ρ of discriminating the signal to be detected can be divided into:

on the one hand, the probability s of detecting the signal when it is present (during the ON periods) with s approximately equal to 1, for an (ON/ON+OFF) proportion of samples (so-called "negative" noise);

on the other hand, the probability r of detecting the signal when it is absent (during the OFF periods), this presence then being due to the noise for an (OFF/ON+OFF) proportion of samples (so-called "positive" noise);

that is ρ=(s.ON+r.OFF)/Z, with: ON+OFF=Z

In a similar manner to the calculation of Sabs, Spre is obtained:

$$Spre=(In-Z)*[(ON/Z).s^2+(OFF/Z).r^2]$$

with ρ=(s.ON+r.OFF)/Z, that is r=(Z.ρ−s.ON)/OFF thus $Spre=[(In-Z)/Z]*[ON.s^2+(Z^2.\rho^2+s^2.ON^2-2.Z.\rho.s.ON)/OFF)$ and, since Z=ON+OFF, $$Spre=(In-Z)(s^2.ON/OFF)+Z.\rho^2/OFF-2.ON.\rho.s/OFF)]$$

from which the value of Spre given above is easily deduced.

Finally, in a decision step, the correlation value SR is compared with the theoretical absence mean value Sabs and the theoretical presence mean value, and the presence or absence of the signal to be detected in the set of received signals is deduced from these comparisons.

According to the aspect of the invention developed with regard to FIGS. 4A to 4G, 10, 11 and 7, during the decision step, the true correlation value SR (here equal to 30) is compared with the two theoretical correlation mean values Sabs (here equal to 12.25) and Spre (here equal to 25.2) and the presence or absence of the signal to be detected is deduced from the result of this comparison.

Here, the absolute values of the differences between SR and the theoretical mean values Sabs and Spre are equal respectively to 17.75 and 4.8 and, according to the particular embodiment, it is decided that the signal to be detected is present.

There can be seen, in FIG. 11, after the start 2300, an operation 2310 of initializing, at the numerical value 0, variables j and k which represent two counters only used in the calculations and without any physical significance.

The operation 2315 next consists of positioning the switch 38 so that the signal which reaches the discrimination means 211 is the one which was received by the receiver 37.

Next, the operation 2320 and the operation 2330 jointly carry out a so-called measurement step for negative noise s. The operation 2320 consists of:

- a so-called "negative test sending" step, consisting of the sending, by the sender 251, of a signal having the frequency f with an occurrence duration $T_A$,
- a so-called "negative test listening" step, during which the receiver 250 set of signals including a signal representing the signal sent during the negative test sending step,
- a so-called "negative discrimination" step, during which the discrimination means 211 filters and discriminates the signal sent during the negative test sending step, from the set of signals received during the negative test listening step, and delivers an output signal whose level represents the result of the said discrimination.

The operation 2330 next consists of a so-called "negative sampling" step, during which the controller 216 and the timer 224 sample the signal delivered during the negative discrimination step by reading, at each pulse of the timer 224 (which operates here at 100 Hz) during the duration $T_A$, the link between this controller and the discrimination means. At the end of the negative sampling step, the controller 216 determines a so-called "negative noise" value s as being a function (here identity) of the ratio of the number of samples which correspond to discrimination of the signal, during the occurrence duration $T_A$, over the number of samples during the duration $T_A$.

Next, the operation 2340 and the operation 2350 jointly carry out a so-called measurement step for positive noise r. The operation 2340 consists of:

- a so-called "silence" step, consisting of the sending, by the sender 251, of no signal, during a duration $T_B$,
- a so-called "positive test listening" step, during which the receiver 250 receives a set of signals,
- a so-called "positive discrimination" step, during which the discrimination means 211 filters and discriminates the signal sent during the negative test sending step, from the set of signals received during the positive test listening step, and delivers an output signal whose level represents the result of the said discrimination, The operation 2350 next consists of a so-called "positive sampling" step, during which the controller 216 and the timer 224 sample the signal delivered during the positive discrimination step by reading, at each pulse of the timer 224 (which operates here at 100 Hz) during the duration $T_B$, the link between this controller and the discrimination means. At the end of the positive sampling step, the controller 216 determines a so-called "positive noise" value r as being a function (here identity) of the ratio of the number of samples which correspond to discrimination of the signal, during the duration $T_B$, over the number of samples during the duration $T_B$.

The test 2360 next determines whether:

$$1+(s-r)^2/4.r.s > \text{Threshold\_1}$$

or not. The test 2360 is referred to as a "noise" test, and compares a function of the positive and negative noises with a predetermined value. According to the result of the noise test 2360, the signal transmission step (see operation 2450 below) is or is not performed. This is because this test determines whether the difference between s and r is sufficient for a signal to be discerned. To that end, the value of Threshold\_1 is determined as greater than 1 and, for example, equal to 1.15.

It should be noted here that the function compared with the value Threshold\_1 during the test 2360 is the value of Spre/Sabs when the cycle ratio is equal to $\alpha$. Here, the first term of the inequality is equal to 1.17 and the result of the test is therefore positive.

When the result of the test 2360 is positive, the controller 216 returns to the operation 2315. When the result of the test 2360 is negative, the operation 2370 increments the counter j by 1. Next, the test 2380 determines whether or not the counter j is greater than the variable Threshold\_4. When the result of the test 2380 is positive, the operation 2390 consists of replacing the value of k by the value of k incremented by 1, calculated modulo K. The operation 2400 consists of taking f=f(k) from the table of K frequencies stored in read-only memory.

The operation 2410 next consists of resetting the value of the counter j to zero. Next, the controller 216 returns to the operation 2315.

When the result of the test 2360 is positive, the controller 216 carries out a so-called "determination" step which consists of the operations 2420, 2430 and 2440, during which physical characteristics of a signal and its detection are determined taking into account the positive and negative noise values.

The operation 2420 consists of determining the cycle ratio a as being equal to the ratio r over r+s.

This is because, as described above, a correlation measurement SR is going to be compared with two theoretical correlation mean values respectively related to an assumption of signal absence (Sabs) and an assumption of signal presence (Spre) in order to determine whether SR is closer to the value Sabs or the value Spre and to thereby deduce whether the signal is present or not, and, consequently, whether the event is present or not.

It is therefore preferable that the values Spre and Sabs are as different as possible, that is to say, their ratio is as large as possible.

The cycle ratio $\alpha$ being defined as equal to ON/Z, this gives: ON=$\alpha$.Z and OFF=(1-$\alpha$).Z.

Therefore Spre/Sabs=$1+[(\alpha.(s-\rho)^2)/((1-\alpha).\rho^2)]$

Knowing that $\rho=(s.ON+r.OFF)/Z$,

Spre/Sabs=$1+(\alpha.(s-r)^2(1-\alpha)^2)/(1-\alpha)((s-r).\alpha+r)^2$

Let U=s-r, the derivative of Spre/Sabs as a function of a is equal to:

$$(Spre/Sabs)'(\alpha)=U^2(U.\alpha+r).(r-(2.r+U).\alpha)/(U.\alpha+r)^4$$

This derivative is zero when $\alpha$=r/r+s.

The operation 2430 consists of determining the signal occurrence duration $T_{ON}=\alpha T$. The operation 2440 consists of determining the signal absence duration $T_{OFF}=(1-\alpha)$ T.

The operation 2445 next consists of positioning the switch 38 so that the signal which reaches the discrimination means 211 is the one which was received by the receiver 33.

The operation 2450 next consists of a so-called "transmission" step, during which the controller 216 control the sending, by the sender 251, of a signal having the said physical characteristics determined during the determination step, and in particular the occurrence duration $T_{ON}$ during the period of duration T, and the frequency f, and the receiver 250 receives a set of so-called "received" signals including a signal representing the signal sent.

The operation 2460 consists of a so-called "detection discrimination" step, during which the discrimination means 211 filters and discriminates the signal sent from the set of received signals and delivers an output signal, the level of which represents the result of this discrimination, and a so-called "detection sampling" step, during which the controller 216 and the timer 224 sample the level thus obtained in In signal samples spread over a duration greater than a repetition period T. here of two periods T.

The operation 2460 also consists of a so-called "rate calculation" step, during which the controller 216 measures, over at least part of the sampling duration, the rate ρ of samples whose level represents the presence of the said signal, this rate ρ being the ratio of the number of samples whose level represents the presence of the signal to be detected, over the total number of samples in the said part of the sampling duration.

The operation 2470 next consists of a so-called "correlation measurement" step, during which the controller 216 maps, to each sample of rank i varying from 1 to In, a state value B(i) representing its level and calculates, during at least part of the sampling duration, a true correlation value SR, by summing, for each pair of samples of ranks i and i+Z, the instantaneous value of correlation between the state value B(i) and the state value B(i+Z), the samples of ranks i and i+Z being located at instants displaced by a period J. Z being the number of samples taken during a period T of the signal to be detected.

The operation 2480 next consists of a so-called "theoretical evaluation" step, during which determination of the so-called "theoretical absence mean" value Sabs and "theoretical presence mean" value Spre is carried out, using at least one of the positive or negative noises. Here the theoretical presence correlation mean value is equal to:

$$Spre=(In-Z)[(ON*(s-\rho)^2/OFF)+\rho^2]$$

in which:

s is the negative noise,

ON is the number of samples during a duration $T_{ON}$

OFF is the number of samples during a duration $T_{OFF}$ of <<silence>> between two durations $T_{ON}$ that is, therefore: ON=αZ=r.Z/(r+s)

and OFF=(1−α) Z=s.Z/(r+s), r being the positive noise.

Next, the controller 216 performs the so-called "rate consistency" test 2490, during which it compares a function of the rate ρ of samples whose level represents the presence of the said signal, with a predetermined value Threshold_2: if the absolute value of [(ρ.Z((s.ON+r.OFF))−1] is less than the predetermined value Threshold_2, the test 1300 is performed, otherwise, the test 2520 is performed.

Here the value of Threshold_2 is 0.4 and the first term of the inequality is equal to 0.36. The result of the test 2490 is therefore positive.

The test 2500 determines whether or not the value of SR is greater than the mean value between Sabs and Spre. When the result of the test 2500 is negative, the operation 2315 is reiterated. Here 30>(12.25+25.2)/2=18.725, and therefore the result of test 2500 is positive. When the result of test 2500 is positive, the controller 216 decides, during the decision step, that the signal is present, and processes the presence information, during the operation 2510, which can consist of a remote sending, a storing to random access memory or a data processing, for example.

The test 2520, which is performed when the result of the test 2490 is negative, is referred to as a "rate consistency" test. During this test, the controller 216 compares a function of the rate ρ of samples whose level represents the presence of the said signal, with a predetermined value Threshold_3: if the absolute value of [(ρ/r)−1] is less than the predetermined value Threshold_3, the test 2530 is performed, otherwise the operation 2315 is reiterated.

The test 2530 determines whether or not the value of SR is less than the mean value of Sabs and Spre. When the result of the test 2530 is negative, the operation 2315 is reiterated. When the result of the test 2530 is positive, the controller 216 decides, during the decision step 2530, that the signal is absent, and processes the presence information during the operation 2540, which may consist of remote sending, storing in random access memory or processing of data, for example.

It should be noted that:

according to the result of the rate consistency test 2490, the decision step 2500 is performed or not performed, according to the result of the rate consistency test 2520, the decision step 2530 is performed or not performed, following one of the processing operations 2510 or 2540, the operation of the device is stopped.

When considered as a part of the flow diagram of FIG. 11, the description of FIG. 7 should be amended as follows:

"memory 103" should read "memory 222",

"memory 109" should read "memory 223",

"from 1270 FIG. 6B" should read "from 2470 FIG. 11", and

"to 1280 FIG. 6B" should read "to 2480 FIG. 11".

In a simplified variant (not shown), the receiver 37 and the switch 38 can be omitted, so that the positive and negative noises as well as the detection of the signal are effected using the receiver 33.

Furthermore, the device described with reference to FIGS. 5, 7 and 11 may use combinations of all the general and particular embodiments of the method described with regard to FIGS. 4A to 4G.

According to another variant (not depicted), the decision of signal presence may be taken according to any other respective position of the values SR, Sabs, and Spre, and possibly according to an additional factor from analysis of all or part of the set of sampled signals.

The fifth and sixth aspects of the invention apply to the detection of any event capable of affecting signals on which the tolerances on the durations ON and OFF is small compared with these durations ON and OFF.

According to a variant, not depicted, the physical characteristics determined during the determination step include an amplitude, the value of which is a function of the positive and negative noise values, and the signal sent during the transmission step has the said amplitude.

According to a variant, not depicted, the physical characteristics determined during the determination step include a signal frequency, the value of which is a function of the positive and negative noise values, and the signal sent during the transmission step has the said amplitude.

According to another variant, not depicted, the physical characteristics determined during the determination step include a sampling threshold, the value of which is a function of the positive and negative noise values, and the sampling step uses the said sampling threshold.

According to another variant, not depicted, the decision of signal presence may be taken according to any other respective position of the values SR, Sabs and Spre, and possibly according to an additional factor from analysis of all or part of the set of sampled signals.

According to a variant, not depicted, operations with durations which are all different are used in such a way that all the empty reservoirs are detected in a single procedure.

According to another variant, not depicted, the element 122d may be omitted, so that the determinations of positive and negative noise as well as detection of the signal are carried out using the elements 122a, 122b and 122c.

Furthermore, the device described with reference to FIGS. 1 to 3B may use combinations of all the general and particular embodiments of the method of the invention.

The invention applies to the detection of any event capable of affecting signals on which the tolerances on the durations ON and OFF is small compared with these durations ON and OFF.

According to a variant (not shown), the positive and negative noises can be measured each time an ink level is passed and the cycle ratio a can be recalculated according to the new positive and negative noise values.

According to another variant, not depicted, the signal sent is a square signal whose amplitude is successively chosen so as to correspond to predetermined ink levels in a reservoir. Each time the detection of the signal having the said amplitude indicates that the said signal is absent, a new, higher, amplitude is attributed to the square signal so as to detect the passing of a new predetermined ink level value. This variant has the advantage that the cycle ratio of the signal used remains constant and can therefore correspond to the best conditions for detection of the ink level.

It should be noted that the description below relates to the detection of the presence of a periodic signal whose principal discrimination characteristic is frequency. However, the invention is readily applied, for persons skilled in the art, to the detection of non-periodic signals, or those of which it is the amplitude, phase, or more generally any information modulating a physical quantity, which is the characteristic enabling discrimination among the set of signals.

What is claimed is:

1. A method of detecting absence of a product in a reservoir comprising:
    a transmission step of transmitting a signal affected by the presence of the product in the reservoir; and
    detecting the presence of the signal amongst a set of signals, the signal having an occurrence duration $T_{ON}$, said detecting step comprising:
    a discrimination step, during which the signal is discriminated from the set of signals, and an output signal is delivered, the level of which represents the result of the discrimination of the signal from the set of signals;
    a sampling step, during which the level thus obtained is sampled in In signal samples spread over a sampling duration greater than a repetition period T;
    a correlation step, during which, to each sample of rank i varying from 1 to In, a state value B(i) representing the level of the sample is mapped and, during at least part of the sampling duration, a true correlation value SR is calculated, by summing, for each pair of samples of ranks i and i+Z, the instantaneous value of correlation between the state value B(i) and the state value B(i+1) the samples of ranks i and i+Z being located at instants displaced by a period T, Z being the number of samples taken during a period T of the signal to be detected;
    a rate calculation step, during which the rate ρ of samples, whose level represents the presence of the signal, is measured over at least part of the sampling duration, the rate ρ being the ratio of the number of samples whose level represents the presence of the signal to be detected, over the total number of samples in the part of the sampling duration;
    a theoretical evaluation step, during which the determination of at least one theoretical mean value is carried out; and
    a decision step, during which the true correlation value SR is compared with each theoretical mean value, and the presence or absence of the signal to be detected is deduced from the result of this comparison.

2. A method according to claim 1, wherein during the transmission step, an electromagnetic signal is sent to the reservoir and a set of electromagnetic signals is received from the reservoir.

3. A method according to claim 1, wherein during the transmission step, an electrical signal is transmitted to the product present in the reservoir and a set of signals is received from the reservoir.

4. A method according to claim 1, wherein during the transmission step, an electromagnetic signal is sent to the reservoir and a set of electromagnetic signals is received from the reservoir, and the product present in the reservoir is connected electrically to a fixed voltage.

5. A method according to claim 4, wherein during the transmission step, a signal is sent on an electrical conductor forming a capacitor with any product present in the reservoir.

6. A method according to either one of claims 4 or 5, wherein the product present in the reservoir is connected to the fixed voltage by means of a galvanic link.

7. A method according to either one of claims 4 or 5, wherein any product present in the reservoir is connected to the fixed voltage by means of a capacitor.

8. A method according to any one of claims 1 to 5, wherein during the transmission step, a plurality of signals affected by the presence of product in a plurality of reservoirs is transmitted successively, and the presence of each of the plurality of the signals is detected.

9. A method according to claim 8, wherein during the theoretical evaluation step, the determination of a plurality of theoretical presence mean values, corresponding to the presence of product in a plurality of reservoirs, is carried out.

10. A method according to any one of claims 1 to 5, wherein calculation of the true correlation value SR is performed by summing the product B(i).B(i+Z) of the pairs of state values in accordance with the following formula:

$$SR = \sum_{i=1}^{i=In-Z} B(i) \cdot B(i+Z)$$

in which Z is the number of samples taken during a period T.

11. A method according to any one of claims 1 to 5, wherein a theoretical absence mean value Sabs is determined as a function of the rate ρ.

12. A method according to claim 11, wherein calculation of the theoretical absence mean value Sabs is carried out in accordance with the following formula:

$Sabs=(In-Z)\rho^2$ where Z is the number of samples during a period T.

13. A method according to any one of claims 1 to 5, wherein during the theoretical evaluation step, Nc theoretical presence mean values Spre are determined, Nc being equal to the number of reservoirs, and wherein during the decision step, the true correlation value SR is compared, on the one hand, with the theoretical absence mean value Sabs and, on the other hand, with at least the theoretical presence mean value Spre(Nc), and the presence of the product in all the reservoirs or the absence of the product in at least one of the reservoirs is deduced from the result of these comparisons.

14. A method according to claim 13, wherein each of the theoretical presence mean values Spre is determined as a function of the rate $\rho$.

15. A method according to claim 14, wherein each calculation of theoretical correlation mean value Spre(Nc) is carried out in accordance with the following formula.

$$Spre(Nc)=(In-Z)[ON*(s-p)^2/OFF)+p^2]$$

where:
- s is the probability of detecting the samples delivered during the duration $T_{ON}$ of the periodic signal, when there is product in each of the Nc reservoirs,
- ON is the number of samples during a duration $T_{ON}$
- OFF is the number of samples during a duration $T_{OFF}$ of <<silence>> between two durations $T_{ON}$.

16. A method according to claim 13, wherein said decision step decides that the product to be detected is present in a number I of the Nc reservoirs when the true correlation value SR is greater than a threshold value which is intermediate between the I−1-th theoretical correlation mean Spre(I−1) and the I-th theoretical correlation mean Spre(I).

17. A method according to claim 13, wherein said decision step decides that the product to be detected is present in all reservoirs only when the rate $\rho$ of samples representing the presence of the signal to be detected is greater than a predetermined value Threshold.

18. A method for measuring a quantity of product in at least one reservoir comprising:
- a transmission step, for each reservoir, of sending a signal affected by the presence of the product in the reservoir; and
- detecting the presence of the signal amongst a set of signals, the signal having in succession at least two non-zero amplitudes during an occurrence duration $T_{ON}$, said detecting step comprising:
- a discrimination step, during which the signal is discriminated from the set of signals, and an output signal is delivered, the level of which represents the result of the discrimination of the signal from the set of signals;
- a sampling step, during which the level thus obtained is sampled in In signal samples spread over a duration greater than a repetition period T;
- a correlation step, during which, to each sample of rank i varying from 1 to In, a state value B(i) representing the level of the sample is mapped and, during at least part of the sampling duration, a true correlation value SR is calculated, by summing, for each pair of samples of ranks i and i+Z, the instantaneous value of correlation between the state value B(i) and the state value B(i+1), the samples of ranks i and i+Z being located at instants displaced by a period T, Z being the number of samples taken during a period T of the signal to be detected;
- a rate calculation step, during which the rate $\rho$ of samples, whose level represents the presence of the signal, is measured over at least part of the sampling duration, the rate $\rho$ being the ratio of the number of samples whose level represents the presence of the signal to be detected, over the total number of samples in the part of the sampling duration;
- a theoretical evaluation step, during which the determination of at least one theoretical correlation mean value is carried out; and
- a decision step, during which the true correlation value SR is compared with each theoretical correlation mean value, and the quantity of product is deduced from the result of this comparison.

19. A method according to claim 18, wherein the signal has a succession of N non-zero amplitudes, having each of these amplitudes for a predetermined duration.

20. A method according to claim 19, wherein the durations are identical.

21. A method according to claim 18, wherein the signal has, over the duration $T_{ON}$, a continuously monotonic amplitude.

22. A method according to any one of claims 18 to 21, wherein during the sampling step, the level is sampled in In samples, over a duration equal to a multiple of the repetition period T where the multiplication factor being greater than or equal to two.

23. A method according to any one of claims 18 to 21, wherein calculation of the true correlation value SR is performed by summing the product B(i).B(i+Z) of the pairs of state values in accordance with the following formula:

$$SR = \sum_{i=1}^{i=In-Z} B(i) \cdot B(i+Z)$$

in which Z is the number of samples taken during a period T.

24. A method according to any one of claims 18 to 21, wherein the theoretical correlation mean value Sabs is determined as a function of the rate $\rho$.

25. A method according to claim 24, wherein calculation of the theoretical correlation mean value Sabs is carried out in accordance with the following formula:

$$Sabs=(In-Z)\rho^2$$

where Z is the number of samples during a period T.

26. A method according to any one of claims 18 to 21, wherein during the theoretical evaluation step, Nn theoretical correlation mean values Spre(j) are determined, j being an integer number ranging from 1 to Nn, and wherein during the decision step, the true correlation value SR is compared with the theoretical correlation mean value Sabs and with at least one of the Nn theoretical correlation mean values Spre(j), and the measurement of the quantity of product to be detected is deduced from the result of these comparisons.

27. A method according to claim 26, wherein each of the Nn theoretical presence mean values Spre(j) is determined as a function of the rate $\rho$.

28. A method according to claim 27, wherein calculation of each of the Nn theoretical correlation mean values Spre(j) is carried out in accordance with the following formula:

$$Spre=(In-Z)[ON*(s-p)^2/OFF)+p^2]$$

where
- s is the probability of detecting the samples delivered during the duration $T_{ON}$ of the periodic signal, ON is the number of samples during a duration $T_{ON}$ OFF is the number of samples during a duration $T_{OFF}$ of "silence" between two durations $T_{ON}$.

29. A method according to claim 26, wherein said decision step decides that the quantity of product to be measured is greater than a j-th level when the actual correlation value SR is greater than a j-th threshold value which is intermediate between the j−1-th theoretical correlation mean Spre(j−1) and the j-th theoretical correlation mean value Spre(j).

30. A method according to any one of claims 18 to 21, wherein said decision step decides that the signal to be detected is present solely when the rate ρ of samples representing the presence of the signal to be detected is greater than a predetermined value Threshold.

31. A method according to any one of claims 18 to 21, wherein characterized in that the product to be measured is an ink.

32. A method for detecting an event which affects the transmission of a signal, comprising a negative noise measurement step and a positive noise measurement step, wherein the negative noise measurement step includes:

a negative test sending step during which a signal is sent having predetermined physical characteristics with an occurrence duration $T_A$;

a negative test listening step during which a set of signals is received able to include a signal representing the signal sent during the negative test sending step;

a negative discrimination step during which the signal sent during the negative test sending step is discriminated, from the set of signals received during the negative test listening step, and an output signal is delivered whose level represents the result of the discrimination; and a negative sampling step, during which the signal delivered during the negative discrimination step is sampled and a negative noise value s is determined as being a function of the ratio of the number of samples which correspond to the discrimination of the signal during the occurrence duration $T_A$, over the number of samples during the duration $T_A$;

wherein the positive noise measurement step includes:

a silence step during which no signal is sent for a duration $T_B$;

a positive test listening step during which a set of signals is received;

a positive discrimination step during which the signal sent during the negative test sending step is discriminated, from the set of signals received during the positive test listening step, and an output signal is delivered whose level represents the result of the discrimination; and a positive sampling step, during which the signal delivered during the positive discrimination step is sampled and a positive noise value r is determined as being a function of the ratio of the number of samples which correspond to the discrimination of the signal during the duration $T_B$, over the number of samples during the duration $T_B$;

said method further comprising:

a determination step, during which physical characteristics of a signal and of its detection are determined by taking into account the values of the positive and negative noises;

a transmission step, during which a signal is sent having the physical characteristics determined during the determination step, with a frequency f and an occurrence duration $T_{ON}$ in the course of a duration T, and a received set of signals is received and includes a signal representing the sent signal;

a detection discrimination step, during which the signal is discriminated from the set of signals received and an output signal is delivered whose level represents the result of the discrimination of the signal from the set of signals received;

a detection sampling step, during which there is sampled, whilst taking into account the physical characteristics, the level thus obtained in In signal samples distributed over a period greater than a repetition period T; and a decision step, during which the values of the samples are taken into account in order to decide on the presence or absence of the event to be detected.

33. A method according to claim 32, further comprising:

a correlation measurement step, during which there is mapped, to each sample of rank i varying from 1 to In, a state value B(i) representing the level of the sample and, during at least part of the sampling period, a true correlation value SR is calculated by summing, for each pair of samples of ranks i and i+Z, the value of instantaneous correlation between the state value B(i) and the state value B(i+Z), the samples of ranks i and i+Z being located at instants displaced by a period T, Z being the number of samples taken during a period T of the signal to be detected;

a rate calculation step, during which the rate ρ of samples whose level represents the presence of the signal is measured over at least part of the sampling duration, the rate ρ being the ratio of the number of samples whose level represents the presence of the signal to be detected, over the total number of samples in the part of the sampling duration;

a theoretical evaluation step, during which the determination of at least one theoretical correlation mean value is carried out; and a decision step, during which the true correlation value SR is compared with each theoretical mean value, and the presence or absence of the signal to be detected is deduced from the result of this comparison.

34. A method according to either one of claims 32 or 33, wherein the physical characteristics determined during the determination step include a cycle ratio whose value is a function of the values of the positive and negative noises and wherein the signal sent during the transmission step has the cycle ratio.

35. A method according to claim 34, wherein the cycle ratio determined during the determination step is substantially equal to the ratio of the positive noise r to the sum of the positive r and negative s noises.

36. A method according to any one of claims 32 or 33, further comprising a noise test, during which a function of the positive and negative noises and a function representing the probability of error that could be made during the decision step are compared with a predetermined value.

37. A method according to claim 36, wherein when the result of the noise test corresponds to a probability of error greater than a predetermined value, the transmission step is not performed.

38. A method according to claim 36, wherein when the result of the noise test corresponds to a probability of error greater than a predetermined value, a change is made in the frequency of the signal sent during the test sending, silence and transmission steps.

39. A method according to any one of claims 32 or 33, further comprising at least one rate consistency test step, during which a function of the sample rate ρ, consistency between the sample rate ρ whose level represents the presence of the signal and the positive and negative noises, is compared with a predetermined value.

40. A method according to claim 39, wherein when the result of the rate consistency test corresponds to an inconsistency greater than a predetermined value, the decision step is not performed.

41. A method according to any one of claims 32 or 33, wherein calculation of the true correlation value SR is performed by summing the product B(i).B(i+Z) of the pairs of state values of the samples respectively referenced i and i+Z, in accordance with the following formula:

$$SR = \sum_{i=1}^{i=In-Z} B(i) \cdot B(i+Z)$$

in which

Z is the number of samples taken during a period T, and

In is the total number of samples.

42. A method according to any one of claims 32 or 33, further comprising calculation of a theoretical absence mean value Sabs in accordance with the following formula:

$$Sabs = (In-Z)\rho^2$$

where

Z is the number of samples during a period T, and

In is the total number of samples.

43. A method according to claim 42, wherein during the theoretical evaluation step, a theoretical presence correlation mean value Spre is determined and wherein during the decision step, the true correlation value SR is compared with the two theoretical correlation mean values Sabs and Spre and the presence or absence of the signal to be detected is deduced from the result of these comparisons.

44. A method according to claim 43, wherein the theoretical presence correlation mean value Spre is calculated in accordance with the following formula:

$$Spre = (In-Z)[(ON/OFF)(s-p)^2 + p^2]$$

where:

s is the negative noise

ON is the number of samples during a duration $T_{ON}$

OFF is the number of samples during a duration $T_{OFF}$ of "silence" between two durations $T_{ON}$.

45. A device for detecting the absence of a product in a reservoir comprising:
   a transmitter constructed to transmit a signal affected by the presence of the product in the reservoir, during a transmission step;
   a receiver to receive the signal among a set of signals, the signal having an occurrence duration $T_{ON}$, the receiving means, the conversion means and the processing means being adapted; and
   a processor to process the received signals;
   wherein the receiver is constructed to discriminate the signal from the set of signals and to deliver an output signal, the level of which represents the result of the discrimination of the signal from the set of signals, and to sample the level thus obtained in In signal samples spread over a duration greater than a repetition period T;

wherein the processor is constructed:
   to map, to each sample of rank i varying from 1 to In, a state value B(i) representing the level of the sample, and to calculate, during at least part of the sampling duration, a true correlation value SR, by summing, for each pair of samples of ranks i and i+Z, the instantaneous value of correlation between the state value B(i) and the state value B(i+Z), the samples of ranks i and i+Z being located at instants displaced by a period T, Z being the number of samples taken during a period T of the signal to be detected;
   to measure, over at least part of the sampling duration, the rate ρ of samples whose level represents the presence of the signal, the rate ρ being the ratio of the number of samples whose level represents the presence of the signal to be detected, over the total number of samples in the part of the sampling duration;
   to determine at least one theoretical mean value; and
   to compare the true correlation value SR with each theoretical mean value and to deduce the presence or absence of the signal to be detected from the result of this comparison.

46. A device according to claim 45, wherein the transmitter is constructed to send an electromagnetic signal to the reservoir and the receiver is constructed to receive a set of electromagnetic signals from the reservoir.

47. A device according to claim 45, wherein the transmitter is constructed to transmit an electrical signal to the product present in the reservoir and the receiver is constructed to receive a set of signals from the reservoir.

48. A device according to claim 45, wherein the transmitter is constructed to send an electromagnetic signal to the reservoir and the receiver is constructed to receive a set of electromagnetic signals from the reservoir, the product present in the reservoir being electrically connected to a fixed voltage.

49. A device according to claim 45, wherein the transmitter is constructed to send a signal on an electrical conductor forming a capacitor with the product present in the reservoir.

50. A device according to either one of claims 48 or 49, wherein a galvanic link electrically connects the product in the reservoir to the fixed voltage.

51. A device according to either one of claims 48 or 49, wherein a capacitor electrically connects the product present in the reservoir to the fixed voltage.

52. A device according to any one of claims 45 to 49, wherein the transmitter is constructed to successively transmit a plurality of signals affected by the presence of product in a plurality of reservoirs and the receiver is constructed to detect the presence of the plurality of the signals.

53. A device according to claim 52, characterized wherein the processor is constructed to determine a plurality of theoretical presence mean values corresponding to the presence of product in a plurality of reservoirs.

54. A device according to any one of claims 45 to 49, wherein the processor is constructed to determine Nc theoretical presence mean values Spre, Nc being equal to the number of reservoirs, and to compare the true correlation value SR on the one hand with a theoretical absence mean value Sabs and, on the other hand, with at least one of the theoretical presence mean values Spre and to deduce the presence of the product in all the reservoirs or the absence of the product in at least one of the reservoirs from the result of these comparisons.

55. A device for measuring a quantity of product in at least one reservoir, including a sending unit adapted, for each reservoir, to send a signal affected by the presence of the product in the reservoir; and a receiving unit and a processing unit adapted to detect the presence of the signal amongst a set of signals, the signal having at least two non zero amplitudes during an occurrence duration $T_{ON}$;

wherein the receiving unit and the processing units are constructed:

to discriminate the signal from the set of signals and to deliver an output signal, the level of which represents the result of the discrimination of the signal from the set of signals;

to sample the level thus obtained in In signal samples spread over a duration greater than a repetition period T; and wherein the processing unit is constructed:

to map, to each sample of rank i varying from 1 to In, a state value B(i) representing the level of the sample, and to calculate, during at least part of the sampling duration, a true correlation value SR, by summing, for each pair of samples of ranks i and i+Z, the instantaneous value of correlation between the state value B(i) and the state value B(i+Z), the samples of ranks i and i+Z being located at instants displaced by a period T, Z being the number of samples taken during a period T of the signal to be detected, to measure, over at least part of the sampling duration, the rate ρ of samples whose level represents the presence of the signal, the rate ρ being the ratio of the number of samples whose level represents the presence of the signal to be detected, over the total number of samples in the part of the sampling duration;

to determine at least one theoretical correlation mean value; and to compare the true correlation value SR with each theoretical correlation mean value and to deduce the quantity of product from the result of this comparison.

56. A device according to claim 55, wherein the sending unit is constructed so that the signal has a succession of N non-zero amplitudes, each of these amplitudes having a predetermined duration.

57. A device according to claim 56, wherein the durations are identical.

58. A device according to claim 55, wherein the sending unit is constructed so that the signal has, over the duration $T_{ON}$, a continuously monotonic amplitude.

59. A device according to any one of claims 55 to 58, wherein the processing unit is constructed to sample the level in In samples, over a duration equal to a multiple of the repetition period T where the multiplication factor is greater than or equal to 2.

60. A device according to any one of claims 55 to 58, wherein the processing unit determines a first theoretical correlation mean value Sabs as being the mean correlation value of a sampled signal having a rate of samples representing the presence of the signal to be detected equal to the rate ρ, assuming the absence of the signal to be detected in the set of signals.

61. A device according to claim 60, wherein the processing unit is constructed to determine Nn theoretical presence mean values Spre(j), j being an integer number ranging from 1 to Nn, and to compare the true correlation value SR with a theoretical absence mean value Sabs and with at least one of the Nn theoretical presence mean values Spre(j) and deduce the measurement of the quantity of product to be detected from the result of these comparisons.

62. A device for detecting an event which affects the transmission of a signal, comprising a calculation unit, a sending unit, a receiving unit and a discrimination unit, together constructed to interactingly effect:

a negative noise measurement step, which includes:

a negative test sending step during which the sending unit sends a signal having predetermined physical characteristics with an occurrence duration $T_A$;

a negative test listening step during which the receiving unit receives a set of signals which includes a signal representing the signal sent during the negative test sending step;

a negative discrimination step during which the discrimination unit discriminates the signal sent during the negative test sending step, from the set of signals received during the negative test listening step, and delivers all output signal whose level represents the result of the discrimination; and a negative sampling step, during which the calculation unit samples the signal delivered during the negative discrimination step and determines a negative noise value s as being a function of the ratio of the number of samples which correspond to the discrimination of the signal during the occurrence duration $T_A$, over the number of samples during the duration $T_A$;

a positive noise measurement step, which includes:

a silence step during which the sending means sends no signal for a duration $T_B$, a positive test listening step during which the receiving unit receives a set of signals;

a positive discrimination step during which the discrimination unit discriminates the signal sent during the negative test sending step, from the set of signals received during the positive test listening step, and delivers an output signal whose level represents the result of the discrimination;

a positive sampling step, during which the calculation unit samples the signal delivered during the positive discrimination step and determines a positive noise value r as being a function of the ratio of the number of samples which correspond to the discrimination of the signal during the duration $T_B$, over the number of samples during the duration $T_B$;

a determination step, during which the calculation unit determines physical characteristics of a signal and of its detection by taking into account the values of the positive and negative noises, a transmission step, during which the sending unit sends a signal having the physical characteristics determined during the determination step, with a frequency f and an occurrence duration $T_{ON}$ in the course of a duration T, and the receiving unit receives a received set of signals which include a signal representing the signal;

a detection discrimination step, during which the discrimination unit discriminates the signal from the set of signals received and delivers an output signal whose level represents the result of the discrimination of the signal from the set of signals received;

a detection sampling step, during which the calculation unit samples sample, whilst taking into account the physical characteristics, the level thus obtained in In signal samples distributed over a period greater than a repetition period T; and a decision step, during which the calculation unit takes into account the values of the samples in order to decide on the presence or absence of the event to be detected.

63. A device according to claim 62, wherein the calculation unit is constructed to perform:
- a correlation measurement, during which the calculation unit maps, to each sample of rank i varying from 1 to In, a state value B(i) representing its level and, during at least part of the sampling period, calculates a true correlation value SR, by summing, for each pair of samples of ranks i and i+Z, the value of instantaneous correlation between the state value B(i) and the state value B(i+Z), the samples of ranks i and i+Z being located at instants displaced by a period T, Z being the number of samples taken during a period T of the signal to be detected;
- a rate calculation, during which the calculation unit measures, over at least part of the sampling duration, the rate ρ of samples whose level represents the presence of the signal, the rate ρ being the ratio of the number of samples whose level represents the presence of the signal to be detected, over the total number of samples in the part of the sampling duration;
- a theoretical evaluation, during which the calculation unit determines at least one theoretical correlation mean value; and
- the taking of a decision, during which the calculation unit compares the true correlation value SR with each theoretical correlation mean value, and deduces the presence or absence of the signal to be detected from the result of this comparison.

64. A device according to either one of claims 62 or 63, wherein the calculation unit is constructed to determine, as physical characteristics of the signal, a cycle ratio whose value is a function of the values of the positive and negative noises, the signal sent during the transmission step having the cycle ratio.

65. A device according to any one of claims 62 or 63, wherein the calculation unit is constructed to perform a noise test, comparing a function of the positive and negative noises, and a function representing the probability of error which could be made during the decision, with a predetermined value.

66. A device according to claim 65, wherein the calculation unit is constructed not to effect the signal transmission when the result of the noise test corresponds to a probability of error greater than a predetermined value.

67. A device according to claim 65, wherein the calculation unit and the sending unit are conjointly constructed to change the frequency of the signal sent during the test sending, silence and transmission steps, when the result of the noise test corresponds to a probability of error greater than a predetermined value.

68. A device according to any one of claims 62 or 63, wherein the calculation unit is constructed to perform a rate consistency test, comparing a function of the rate sample ρ, and a function representing the consistency between the rate ρ of samples whose level represents the presence of the signal and the positive and negative noises, with a predetermined value.

69. A device according to claim 68, wherein the calculation unit is constructed not to make the decision when the result of the rate consistency test corresponds to an inconsistency greater than a predetermined value.

70. A facsimile machine which forms an image using a product contained in a reservoir and further incorporating a device according to any one of claims 45 to 49, 55 to 58, 62 or 63.

71. A printer which forms an image using a product contained in a reservoir and further incorporating a device according to any one of claims 45 to 49, 55 to 58, 62 or 63.

* * * * *

UNITED STATES PATENT AND TRADEMARK OFFICE
CERTIFICATE OF CORRECTION

PATENT NO.     : 6,438,500 B1
DATED          : August 20, 2002
INVENTOR(S)    : Marie Hélène Froger et al.

It is certified that error appears in the above-identified patent and that said Letters Patent is hereby corrected as shown below:

Column 4,
Line 44, "accurately," should read -- accuracy, --.

Column 7,
Line 30, "et" should read -- and --.

Column 8,
Line 65, "et" should read -- and --.

Column 13,
Line 42, "112a14 112c" should read -- 112a - 112c --.

Column 17,
Line 5, the second occurrence of "a" should read -- $\alpha$ --; and
Line 12, "to" should read -- with --.

Column 20,
Line 15, the first occurrence of "$s^2$" should read -- $s^2 +$ --.

Column 21,
Line 4, "invention):" should read -- invention: --.

Column 23,
Line 61, "T.Z" should read -- T, Z --.

Column 29,
Line 59, "C.$M_{ON}$" should read -- c.$M_{ON}$ --.

Column 31,
Line 6, "et" should read -- and --; and
Line 26, "S," should read -- s, --.

Column 35,
Line 2, "control" should read -- controls --; and
Line 58, "[((p.Z((s.ON" should read -- [((p.Z/(s.ON) --.

Column 37,
Line 20, "is" should read -- are --.

UNITED STATES PATENT AND TRADEMARK OFFICE
CERTIFICATE OF CORRECTION

PATENT NO. : 6,438,500 B1
DATED : August 20, 2002
INVENTOR(S) : Marie Hélène Froger et al.

It is certified that error appears in the above-identified patent and that said Letters Patent is hereby corrected as shown below:

Column 40,
Line 24, "being" should read -- is --.

Column 41,
Line 16, "characterized in that" should be deleted.

Signed and Sealed this

Twenty-fifth Day of February, 2003

JAMES E. ROGAN
*Director of the United States Patent and Trademark Office*